United States Patent
Ma et al.

(10) Patent No.: US 12,177,780 B2
(45) Date of Patent: Dec. 24, 2024

(54) SYSTEMS AND METHODS FOR POWER SAVING IN A WIRELESS COMMUNICATION SYSTEM

(71) Applicant: Huawei Technologies Co., Ltd., Shenzhen (CN)

(72) Inventors: Jianglei Ma, Ottawa (CA); Yongxia Lyu, Shenzhen (CN); Liqing Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/237,601

(22) Filed: Apr. 22, 2021

(65) Prior Publication Data

US 2021/0377860 A1    Dec. 2, 2021

Related U.S. Application Data

(60) Provisional application No. 63/029,771, filed on May 26, 2020.

(51) Int. Cl.
*H04W 52/02* (2009.01)
*H04L 1/1867* (2023.01)

(52) U.S. Cl.
CPC ....... *H04W 52/0229* (2013.01); *H04L 1/1896* (2013.01); *H04W 52/0274* (2013.01)

(58) Field of Classification Search
CPC ......... H04W 52/0229; H04W 52/0274; H04W 28/0221; H04L 1/1896

See application file for complete search history.

(56) References Cited

U.S. PATENT DOCUMENTS 11,317,446 B2   4/2022  Shih et al.
2010/0220717 A1*  9/2010  Kim ............... H04L 29/06027
                                              370/352

(Continued)

FOREIGN PATENT DOCUMENTS

CN   107409435 A   11/2017
CN   110896558 A    3/2020

(Continued)

OTHER PUBLICATIONS

"3rd Generation Partnership Project; Technical Specification Group Radio Access Network; NR; Physical channels and modulation (Release 15)". Technical specification. 3GPP TS 38.211 V15.6.0. Jun. 2019. 97 pages.

(Continued)

*Primary Examiner* — Omer S Mian

(74) *Attorney, Agent, or Firm* — Slater Matsil, LLP

(57) ABSTRACT

The power requirements of user equipments (UEs) are expected to increase as their capabilities increase. Some power saving methods have previously been proposed, but are limited by the radio resource control (RRC) protocol and do not address the power consumption associated with having to transition between different RRC states. In some embodiments described herein, there are not different RRC states, but instead a single RRC state. Within that single RRC state, there are different modes of operation, e.g. a default low power operation mode and an enhanced power operation mode. In some embodiments, the UE switches from the default operation mode to the enhanced operation mode on an on-demand basis (e.g. based on the communication capability required by the UE), and then returns back to the default operation mode.

20 Claims, 10 Drawing Sheets

| Communication Parameters | Default Operating Mode 1 (UE type 1 and/or application scenario type 1 and/or service type 1) | Default Operating Mode 2 (UE type 2 and/or application scenario type 2 and/or service type 2) | Enhanced Operating Mode |
|---|---|---|---|
| Number of Rx antennas (low freq band) | 2 | 4 | 8 |
| Number of Tx antennas (low freq band) | 1 | 1 | 2 |
| Number of panels (high freq band) | 1 | 2 | 2 |
| Bandwidth of BWP on which UE can communicate (low freq band) | 1.25 MHz | 5 MHz | 100 MHz |
| Bandwidth of BWP on which UE can communicate (high freq band) | 100 MHz | 200 MHz | 400 MHz |
| Monitoring of DL notification information | Once every 256 radio frames | Once every 16 radio frames | Once every 0.5 radio frames |
| Beam tracking | One beam | One beam | Configurable up to UE capability |
| RRM measurement | One neighbor cell, or no RRM measurement at all for neighbor cell | One neighbor cell | Configurable up to UE capability |
| Tx and Rx resources utilized | Scheduling free | Scheduling free and scheduled in DCI | Scheduling free and scheduled in DCI |
| SCS supported (low freq band) | 15 kHz | 15 kHz or 30 kHz | 15 kHz & 30 kHz |
| SCS supported (high freq band) | 60 kHz | 60 kHz or 120 kHz | 60 kHz & 120 kHz |

(56) References Cited

U.S. PATENT DOCUMENTS

| | | | |
|---|---|---|---|
| 2015/0237578 A1 | 8/2015 | Gogate et al. | |
| 2016/0278159 A1 | 9/2016 | Ljung | |
| 2018/0192436 A1 | 7/2018 | Yi et al. | |
| 2019/0053196 A1* | 2/2019 | Abedini | H04W 72/04 |
| 2019/0253127 A1* | 8/2019 | Kang | H04B 7/063 |
| 2020/0059969 A1* | 2/2020 | Agiwal | H04W 74/0833 |
| 2021/0084538 A1* | 3/2021 | Papa | H04L 12/66 |
| 2021/0092714 A1* | 3/2021 | Ryu | H04W 56/001 |
| 2021/0119758 A1* | 4/2021 | Park | H04W 56/001 |
| 2021/0176610 A1 | 6/2021 | You et al. | |
| 2021/0321446 A1* | 10/2021 | Lee | H04L 5/0044 |

FOREIGN PATENT DOCUMENTS

| | | |
|---|---|---|
| CN | 111182592 A | 5/2020 |
| WO | 2019050323 A1 | 3/2019 |
| WO | 2019066587 A1 | 4/2019 |
| WO | 2020030010 A1 | 2/2020 |

OTHER PUBLICATIONS

"3rd Generation Partnership Project; Technical Specification Group Radio Access Network; Evolved Universal Terrestrial Radio Access (E-UTRA); Physical channels and modulation (Release 15)". Technical specification. 3GPP TS 36.211. V. 15.5.0. Mar. 2019. 238 pages.

"3rd Generation Partnership Project; Technical Specification Group Radio Access Network; NR; Radio Resource Control (RRC) protocol specification (Release 15)". Technical specification. 3GPP TS 38.331 V15.6.0. Jun. 2019. 519 pages.

"3rd Generation Partnership Project; Technical Specification Group Radio Access Network; NR; Physical layer procedures for control (Release 15)". Technical specification. 3GPP TS 38.213 V15.6.0. Jun. 2019. 107 pages.

"3rd Generation Partnership Project; Technical Specification Group Radio Access Network; NR; Study on User Equipment (UE) power saving in NR (Release 16)". Technical specification. 3GPP TR 38.840 V16.0.0. Jun. 2019. 74 pages.

CMCC, "Discussion on framework of reduced capability NR devices", 3GPP TSG RAN WG1 #101, R1-2003969, May 25-Jun. 5, 2020, 4 Pages, e-Meeting.

* cited by examiner

| Communication Parameters | UE Capability 302 | Default Operating Mode 304 | Enhanced Operating Mode 306 |
|---|---|---|---|
| Number of Rx antennas (low freq band) | 8 | 2 | 8 |
| Number of Tx antennas (low freq band) | 2 | 1 | 2 |
| Number of panels (high freq band) | 2 | 1 | 2 |
| Bandwidth of BWP on which UE can communicate (low freq band) | 100 MHz | 5 MHz | 100 MHz |
| Bandwidth of BWP on which UE can communicate (high freq band) | 400 MHz | 100 MHz | 400 MHz |
| Monitoring of DL notification information | Once every 0.5 radio frames | Once every 256 radio frames | Configurable to a maximum of once every 0.5 radio frames |
| Beam tracking | Yes | One beam | Configurable up to UE capability |
| RRM measurement | Yes | One neighbor cell, or no RRM measurement at all for neighbor cell | Configurable up to UE capability |
| Tx and Rx resources utilized | Scheduling free and scheduled in DCI | Scheduling free | Scheduling free and scheduled in DCI |
| SCS supported (low freq band) | 15 kHz and 30 kHz | 15 kHz or 30 kHz | 15 kHz and 30 kHz |
| SCS supported (high freq band) | 60 kHz and 120 kHz | 60 kHz or 120 kHz | 60 kHz and 120 kHz |

FIG. 6

| Communication Parameters | Operating Mode 1 (Default) | Operating Mode 2 | Operating Mode 3 |
|---|---|---|---|
| Number of Rx antennas (low freq band) | 2 | 4 | 8 |
| Number of Tx antennas (low freq band) | 1 | 1 | 2 |
| Number of panels (high freq band) | 1 | 2 | 2 |
| Bandwidth of BWP on which UE can communicate (low freq band) | 5 MHz | 20 MHz | Configurable up to 100 MHz |
| Bandwidth of BWP on which UE can communicate (high freq band) | 100 MHz | 100 MHz | Configurable up to 400 MHz |
| Monitoring of DL notification information | Once every 256 radio frames | Once every 16 radio frames | Configurable to a maximum of once every 0.5 radio frames |
| Beam tracking | One beam | One beam | Configurable up to UE capability |
| RRM measurement | One neighbor cell, or no RRM measurement at all for neighbor cell | One neighbor cell | Configurable up to UE capability |
| Tx and Rx resources utilized | Scheduling free | Scheduling free and scheduled in DCI | Scheduling free and scheduled in DCI |
| SCS supported (low freq band) | 15 kHz | 15 kHz or 30 kHz | 15 kHz and 30 kHz |
| SCS supported (high freq band) | 60 kHz | 60 kHz or 120 kHz | 60 kHz and 120 kHz |

FIG. 7

| Communication Parameters | Default Operating Mode 1 (UE type 1 and/or application scenario type 1 and/or service type 1) | Default Operating Mode 2 (UE type 2 and/or application scenario type 2 and/or service type 2) | Enhanced Operating Mode |
|---|---|---|---|
| Number of Rx antennas (low freq band) | 2 | 4 | 8 |
| Number of Tx antennas (low freq band) | 1 | 1 | 2 |
| Number of panels (high freq band) | 1 | 2 | 2 |
| Bandwidth of BWP on which UE can communicate (low freq band) | 1.25 MHz | 5 MHz | 100 MHz |
| Bandwidth of BWP on which UE can communicate (high freq band) | 100 MHz | 200 MHz | 400 MHz |
| Monitoring of DL notification information | Once every 256 radio frames | Once every 16 radio frames | Once every 0.5 radio frames |
| Beam tracking | One beam | One beam | Configurable up to UE capability |
| RRM measurement | One neighbor cell, or no RRM measurement at all for neighbor cell | One neighbor cell | Configurable up to UE capability |
| Tx and Rx resources utilized | Scheduling free | Scheduling free and scheduled in DCI | Scheduling free and scheduled in DCI |
| SCS supported (low freq band) | 15 kHz | 15 kHz or 30 kHz | 15 kHz & 30 kHz |
| SCS supported (high freq band) | 60 kHz | 60 kHz or 120 kHz | 60 kHz & 120 kHz |

FIG. 8

SYSTEMS AND METHODS FOR POWER SAVING IN A WIRELESS COMMUNICATION SYSTEM

PRIORITY

The present application claims the benefit under 35 U.S.C. § 119(e) of U.S. Provisional Patent Application Ser. No. 63/029,771, entitled "Systems and Methods for Power Saving in a Wireless Communication System", which was filed on May 26, 2020.

FIELD

The present application relates to wireless communication, and more specifically to power saving in a wireless communication system.

BACKGROUND

In some wireless communication systems, user equipments (UEs) wirelessly communicate with a network via one or more base stations. A wireless communication from a UE to a base station is referred to as an uplink communication. A wireless communication from a base station to a UE is referred to as a downlink communication.

A UE has a set of communication parameters used to perform wireless communication. When the UE is transmitting, these communication parameters are sometimes instead called transmission parameters. Examples of communication parameters may include: the number of antennas and/or panels used by the UE, the bandwidth over which the UE communicates, the decoding method utilized by the UE, etc. Communication parameters may alternatively be called communication settings.

In some wireless communication systems, the UE and network operate according to a radio resource control (RRC) protocol. The RRC protocol has different states, which are sometimes alternatively referred to as modes. For example, in new radio (NR), the RRC protocol includes: an RRC Idle state in which there is no RRC connection established with the network; a RRC Connected state in which an RRC connection is established; and an RRC Inactive state in which an RRC connection is still established, but the functions of the UE may be reduced, e.g. to help save power.

The RRC protocol involves transitioning between the different states, e.g. from RRC Idle to RRC Connected, back and forth between RRC Connected and RRC Inactive, and back to RRC Idle.

SUMMARY

The power requirements of UEs are expected to increase as their capabilities increase. For example, the next generation of UEs may have more antennas and beams, higher maximum device power (e.g. 26 dBm), larger available channel bandwidths (e.g. 100 MHz), higher frequencies of operation (leading to higher path loss), possibly more monitoring of control channels (e.g. more frequent monitoring of the physical downlink control channel (PDCCH)), etc. It is desired to realize power savings, when possible.

Some power saving methods have previously been proposed that operate within the RRC protocol. For example, power saving settings have been proposed that may be configured in RRC Idle state and/or RRC Connected state and/or RRC Inactive state. As an example, "Active time ON" and "Active time OFF" have been proposed for the RRC protocol in which the UE is "sleeping" during Active time OFF. As another example, discontinuous reception (DRX) has been proposed for the different RRC states. As another example, "go-to-sleep" signaling has been proposed for RRC Connected and RRC Inactive states. As another example, dynamic bandwidth part (BWP) switching and other mechanisms have been proposed for RRC Connected state.

However, these power saving methods are limited to operating within the RRC protocol and are thereby limited by the restrictions of the RRC protocol. Moreover, these power saving methods do not address the power consumption associated with having to transition between the different RRC states, e.g. the power required for signaling and message exchanges to transition from one RRC state (such as RRC Connected state) to another RRC state (such as RRC Inactive state).

In some embodiments described below, systems and methods for wireless communication are disclosed in which there are not different RRC states, but instead a single RRC state, which may be called a "single RRC state" or "single RRC mode". Within that single RRC state, there are different operation modes that consume different amounts of power, e.g. a default operation mode and an enhanced operation mode. In some embodiments, after or upon completing initial access to connect to the network, the UE enters a default operation mode that is associated with lower power consumption. The UE remains in the default operation mode by default, and only temporarily moves into an enhanced operation mode on demand, e.g. when data of a particular service type (such as low latency data) needs to be transmitted to or from the UE. There is no switching between different RRC states.

In some embodiments, in the default operation mode the UE utilizes a first set of communication parameters that are associated with a first communication capability, and in the enhanced operation mode the UE instead utilizes a second set of communication parameters that are associated with a second communication capability. The first communication capability consumes less power than the second communication capability.

As a simple example, the first set of communication parameters defining the first communication capability may include: two transmit antennas, one receive antenna, 5 MHz communication bandwidth, monitoring for downlink control information once every 256 frames, one beam for beaming tracking, radio resource management (RRM) measurement performed for only one neighbour cell or no RRM measurement at all, scheduling free ("grant-free") resources used for transmitting/receiving data, one subcarrier spacing supported, basic HARQ processing time capability (for example 7 OFDM symbols for decoding data and receiving DCI). The second set of communication parameters defining the second communication capability may include: eight transmit antennas, two receive antennas, 100 MHz communication bandwidth, monitoring for downlink control information once every two frames, more than one beam for beaming tracking, RRM measurement performed for multiple neighbour cells, additionally or instead transmitting/receiving data on resources scheduled in downlink control information (DCI), two different subcarrier spacings supported, advanced HARQ processing time capability (for example 3.5 OFDM symbols for decoding data and receiving DCI). Operating using the second set of communication parameters consumes more power than operating using the first set of communication parameters, but by operating using the second set of communication parameters the communication capabilities increase. By default, the UE may wirelessly communicate in the default low power operation mode using the first set of communication parameters, with the UE switching to the enhanced power operation mode (that uses the second set of communication parameters) on an on-demand basis in response to a trigger (e.g. in response to the arrival of data for transmission).

In this way, the following technical benefit may be achieved: lower power may be consumed by default, but when UE communication capabilities need to be temporarily increased, the UE may temporarily switch to an enhanced power operation mode having the increased communication capabilities.

In one embodiment, a method performed by an apparatus (e.g. a UE) may include operating in a default operation mode in which the apparatus wirelessly communicates with a network device (e.g. base station) using a first set of communication parameters. The default operation mode may also be called a first operation mode. Operating in the default operation mode may occur after or upon completion of an initial access procedure. In some embodiments, the default operation mode is one of at least two operation modes. In some embodiments, the at least two operation modes includes a second operation mode. In some embodiments, the second operation mode consumes more power than the default operation mode. In some embodiments, the default operation mode consumes less power than any other operation mode used by the apparatus to communicate with the network device after the initial access. In some embodiments, switching from operating in the default operation mode to instead operating in the second operation mode, and switching from operating in the second operation mode back to operating in the default operation mode occurs without switching RRC states.

BRIEF DESCRIPTION OF THE DRAWINGS

Embodiments will be described, by way of example only, with reference to the accompanying figures wherein:

FIGS. 6 to 8 illustrate different example operation modes and associated communication parameters.

DETAILED DESCRIPTION

For illustrative purposes, specific example embodiments will now be explained in greater detail below in conjunction with the figures.

Example Communication Systems and Devices

Figure 1:
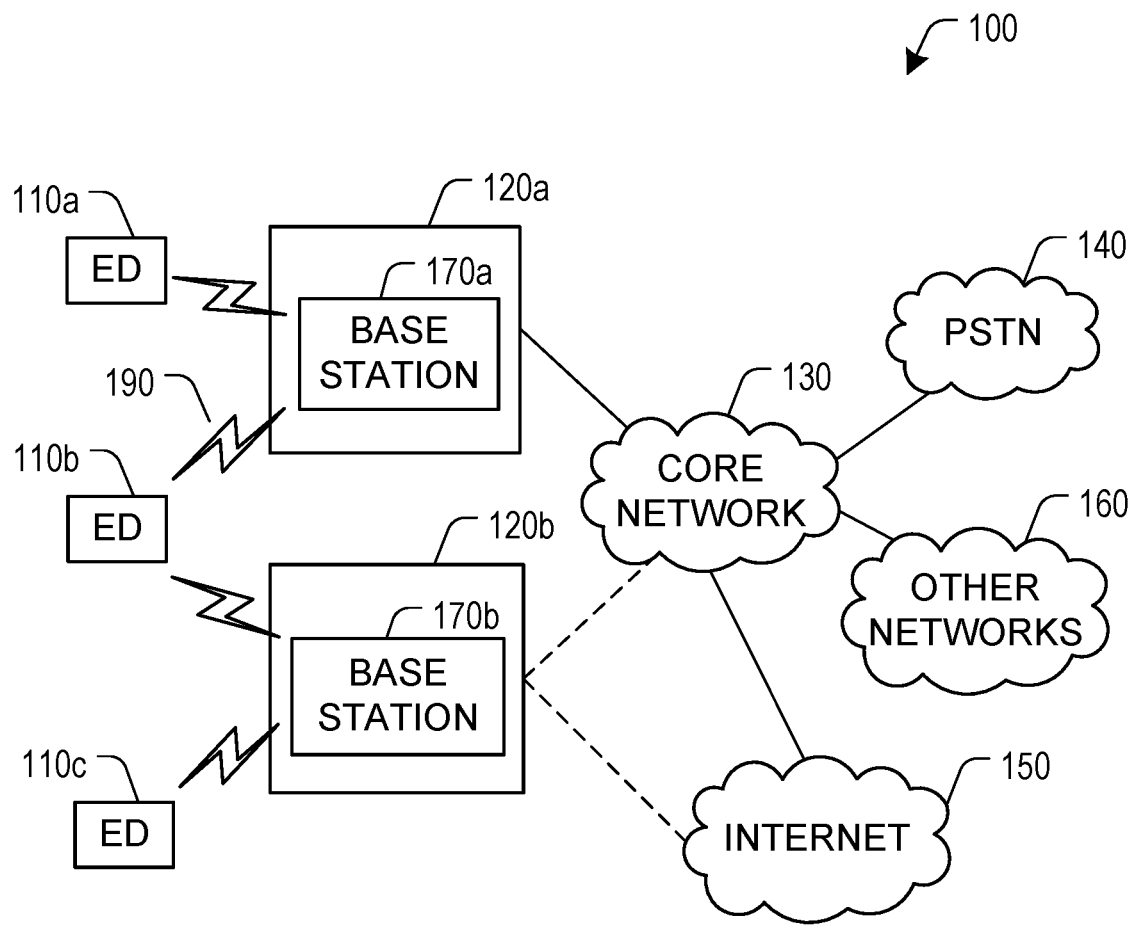
FIG. 1 is a network diagram of an example communication system.

FIG. 1 illustrates an example communication system 100. In general, the communication system 100 enables multiple wireless or wired elements to communicate data and other content. The purpose of the communication system 100 may be to provide content, such as voice, data, video, and/or text, via broadcast, narrowcast, user device to user device, etc. The communication system 100 may operate by sharing resources, such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB or eNB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Figure 2:
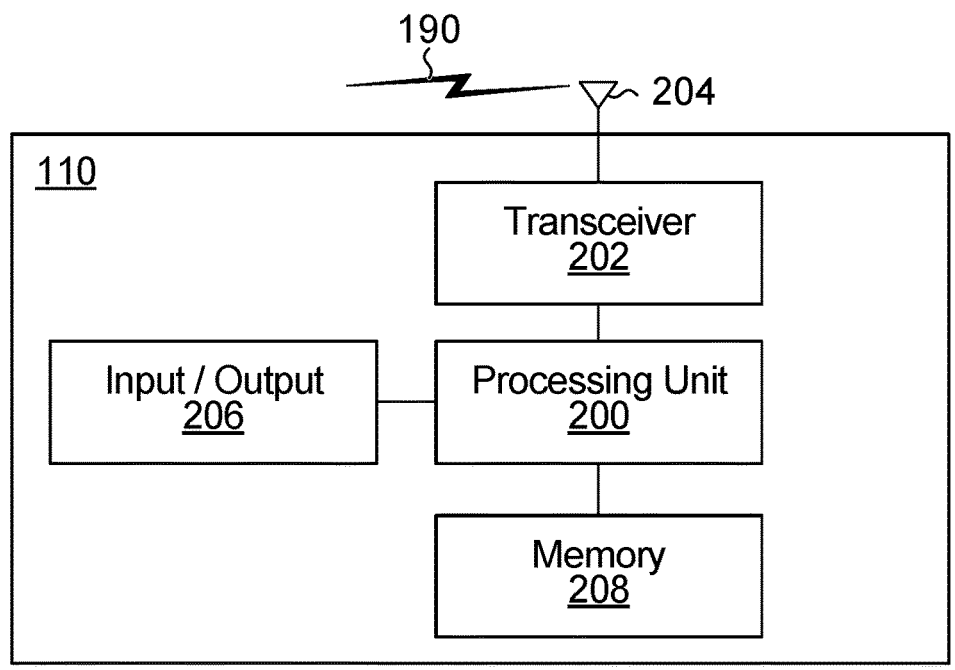
FIG. 2 is a block diagram of an example electronic device.
Figure 3:
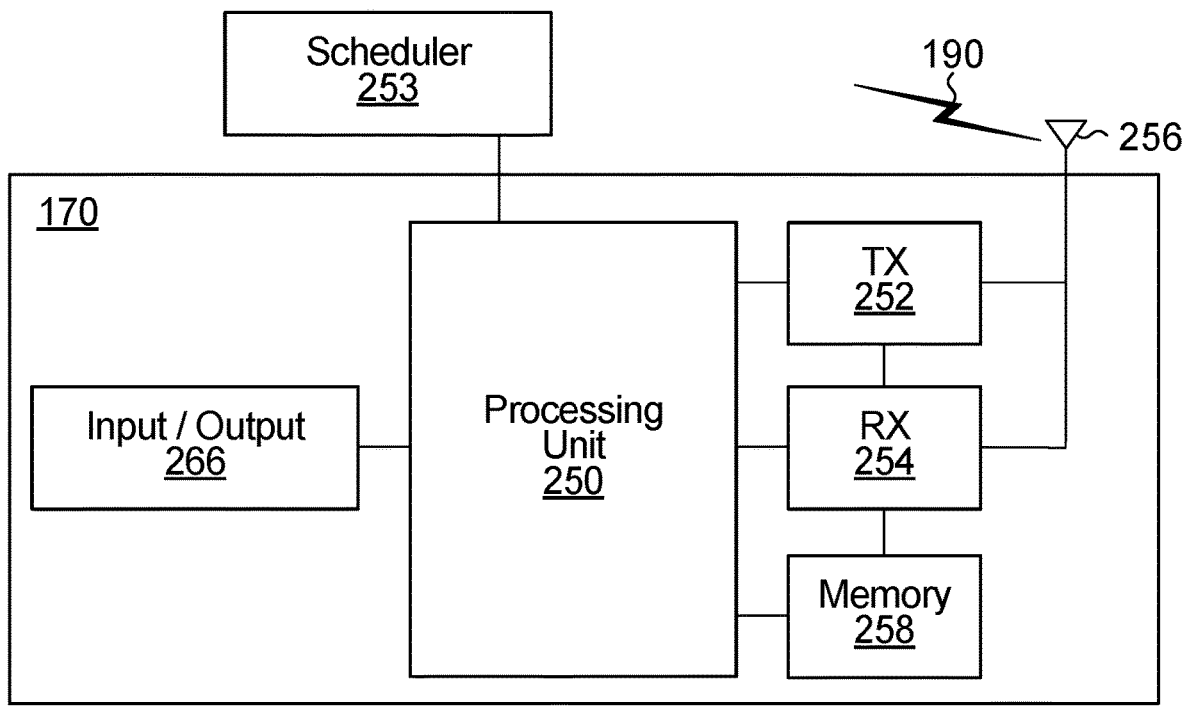
FIG. 3 is a block diagram of another example electronic device.

FIGS. 2 and 3 illustrate example devices that may implement the methods and teachings according to this disclosure. In particular, FIG. 2 illustrates an example ED 110, and FIG. 3 illustrates an example base station 170. These components could be used in the communication system 100 or in any other suitable system.

As shown in FIG. 2, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna 204 or Network Interface Controller (NIC). The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Figure 4:
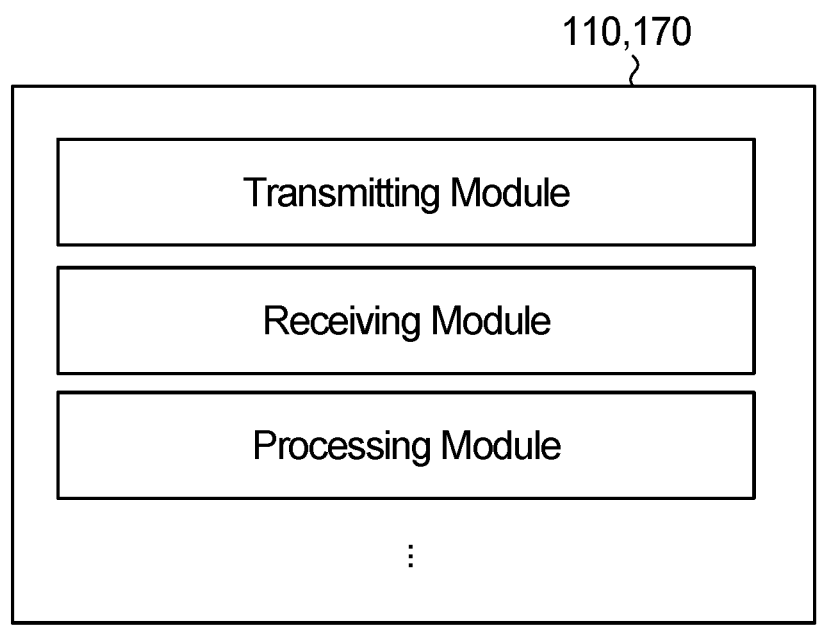
FIG. 4 is a block diagram of example component modules.

One or more steps of the embodiment methods provided herein may be performed by corresponding units or modules, according to FIG. 4. FIG. 4 illustrates units or modules in a device, such as in ED 110 or base station 170. For example, a signal may be transmitted by a transmitting unit or a transmitting module. A signal may be received by a receiving unit or a receiving module. A signal may be processed by a processing unit or a processing module. The processing module may encompass the units/modules described later, in particular the processor 210 or processor 260. Other units/modules may be included in FIG. 4, but are not shown. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Additional details regarding the EDs 110 and the base stations 170 are known to those of skill in the art. As such, these details are omitted here for clarity.

Figure 5:
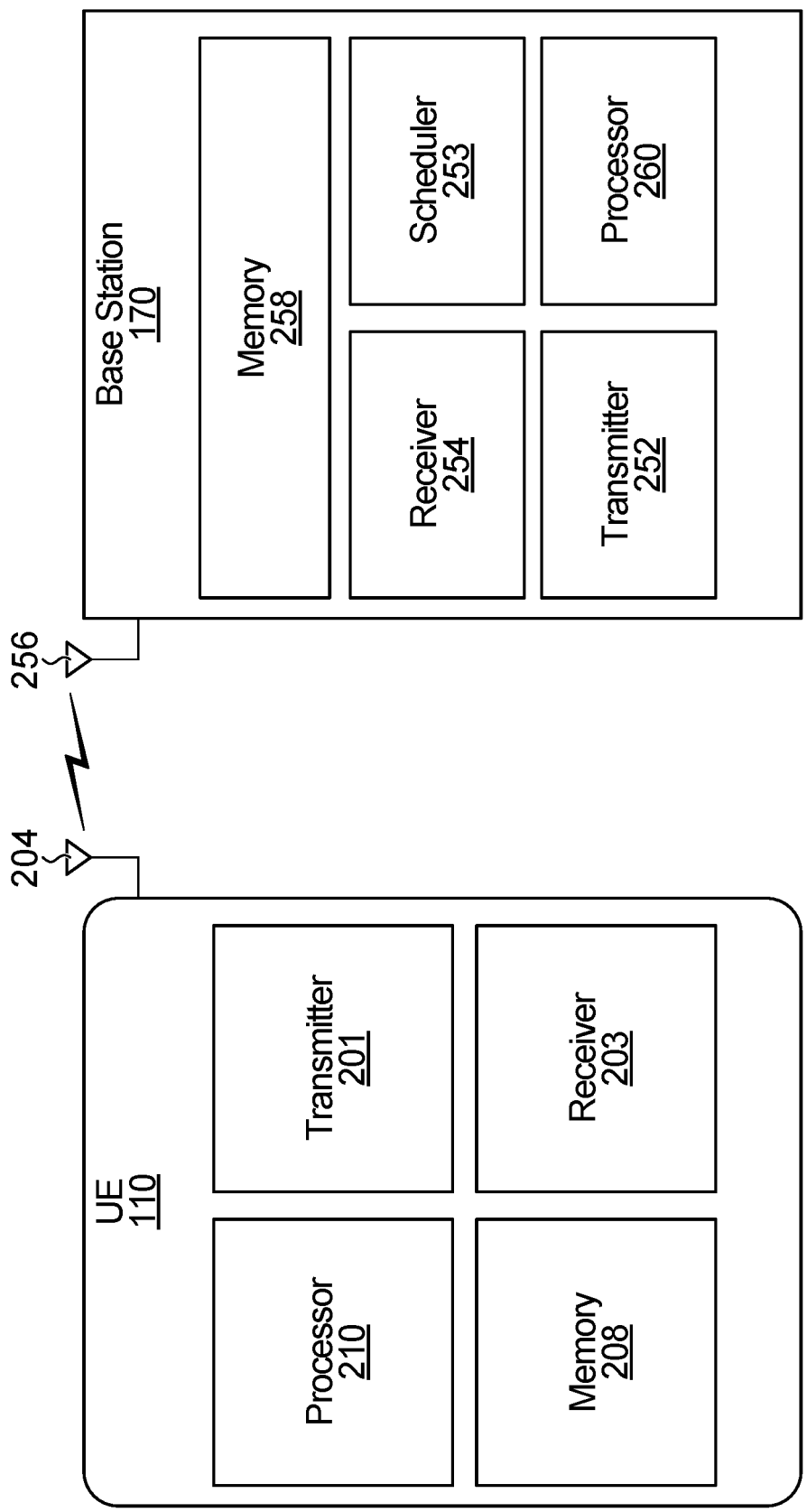
FIG. 5 is a block diagram of an example user equipment and base station.

FIG. 5 illustrates another example of an ED 110 and a base station 170. The ED 110 will hereafter be referred to as a user equipment (UE) 110 or apparatus 110.

The base station 170 may be called other names in some implementations, such as a transmit and receive point (TRP), a base transceiver station, a radio base station, a network node, a network device, a transmit/receive node, a Node B, an evolved NodeB (eNodeB or eNB), a gNB, a relay station, or a remote radio head. In some embodiments, the parts of the base station 170 may be distributed. For example, some of the modules of the base station 170 may be located remote from the equipment housing the antennas of the base station 170, and may be coupled to the equipment housing the antennas over a communication link (not shown). Therefore, in some embodiments, the term base station 170 may also refer to modules on the network side that perform processing operations, such as resource allocation (scheduling), message generation, and encoding/decoding, and that are not necessarily part of the equipment housing the antennas of the base station 170. The modules may also be coupled to other base stations. In some embodiments, the base station 170 may actually be a plurality of base stations that are operating together to serve the UE 110, e.g. through coordinated multipoint transmissions. Also, the term "base station" is used herein to refer to a network device, i.e. a device on the network side.

The base station 170 includes a transmitter 252 and a receiver 254 coupled to one or more antennas 256. Only one antenna 256 is illustrated. One, some, or all of the antennas may alternatively be panels. The transmitter 252 and the receiver 254 may be integrated as a transceiver. The base station 170 further includes a processor 260 for performing operations including those related to preparing a transmission for downlink transmission to the UE 110, and those related to processing uplink transmissions received from the UE 110. Processing operations related to preparing a transmission for downlink transmission include operations such as encoding, modulating, precoding (e.g. MIMO precoding), and generating the symbols for downlink transmission. Processing operations related to processing uplink transmissions include demodulating and decoding the received symbols. The processor 260 may also perform operations relating to initial access, e.g. generating the content of the synchronization signal, generating the system information, processing the random access request, etc. In some embodiments, the processor 260 may generate signaling to configure one or more communication parameters of the UE 110, e.g. to configure the UE communication parameters used in the default operation mode and/or in the enhanced operation mode described herein. In some embodiments, the processor 260 may generate signaling to instruct the UE to switch between operation modes. The signaling may be UE-specific or possibly common to all UEs or a group of UEs, e.g. if the operation mode for more than one UE is being switched at the same time. Any signaling generated by the processor 260 is sent by the transmitter 252. Note that "signaling", as used herein, may alternatively be called control signaling.

The base station 170 further includes a scheduler 253, which may schedule uplink and downlink transmissions, including scheduling grants and/or may configure scheduling free ("grant-free") resources. In some embodiments, the scheduler 253 may generate some or all of the signaling described as being generated by the processor 260. The base station 100 further includes a memory 258 for storing information and data.

Although not illustrated, the processor 260 may form part of the transmitter 252 and/or receiver 254. Also, although not illustrated, the processor 260 may implement the scheduler 253.

The processor 260, the scheduler 253, and the processing components of the transmitter 252 and receiver 254 may each be implemented by the same or different one or more processors that are configured to execute instructions stored in a memory (e.g. in memory 258). Alternatively, some or all of the processor 260, the scheduler 253, and the processing components of the transmitter 252 and receiver 254 may be implemented using dedicated circuitry, such as a programmed field-programmable gate array (FPGA), a graphical processing unit (GPU), or an application-specific integrated circuit (ASIC).

The UE 110 also includes a transmitter 201 and a receiver 203 coupled to one or more antennas 204. Only one antenna 204 is illustrated. One, some, or all of the antennas may alternatively be panels. The transmitter 201 and the receiver 203 may be integrated as a transceiver, e.g. transceiver 202 of FIG. 2. The UE 110 further includes a processor 210 for performing operations including those related to preparing a transmission for uplink transmission to the base station 170, and those related to processing downlink transmissions received from the base station 170. Processing operations related to preparing a transmission for uplink transmission include operations such as encoding, modulating, and generating the symbols for transmission. Processing operations related to processing downlink transmissions include demodulating and decoding the received symbols. Depending upon the embodiment, a downlink transmission may be received by the receiver 254, and the processor 210 may extract signaling from the downlink transmission (e.g. by decoding the signaling) in order to determine one or more communication parameters configured for a default operation mode and/or for an enhanced operation mode. In some embodiments, the processor 210 may instruct the UE 110 to switch between operation modes, e.g. based on a trigger, such as the arrival of data for transmission and/or such as receiving signaling from the base station 170 that instructs switching of the operation mode. In some embodiments, the processor 210 may perform operations relating to initial access, e.g. operations relating to synchronization, decoding and reading the system information, generating a random access request for transmission, etc. In some embodiments, the processor 210 determines the scheduling of uplink and downlink transmissions, which may be based on signaling received by the UE 110 that originated from the scheduler 253 of the base station 170.

Although not illustrated, the processor 210 may form part of the transmitter 201 and/or receiver 203. The UE 110 further includes a memory 208 for storing information and data.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a FPGA, a GPU, or an ASIC.

The base station 170 and the UE 110 may include other components, but these have been omitted for the sake of clarity.

Multi-Level Operation Modes

Embodiments are described below in which the UE 110 may operate in different operation modes associated with different levels of power consumption, e.g. a default low power operation mode and an enhanced power operation mode. In some embodiments, there are not different RRC states, but instead a single RRC state, with the different operation modes existing within that single RRC state. In some embodiments, after or upon completing initial access to connect to the network, the UE 110 enters a default low power operation mode. The UE remains in the low power operation mode by default, and only temporarily moves into a different operation mode (e.g. an enhanced power operation mode) on demand, in response to a trigger.

FIG. 6 illustrates one example of different operation modes and associated communication parameters for UE 110. In some embodiments, the information in FIG. 6 may be stored in memory 208 of the UE 110.

The capability of the UE 110 is indicated in column 302 of FIG. 6. In some embodiments, this capability may be reported to the base station 170 during or after initial access. In the example in FIG. 6, the UE 110 has the following one or more capabilities:

The UE 110 has eight receive antennas and two transmit antennas for operation on low frequency bands.

The UE 110 has two panels for operation on high frequency bands.

The UE 110 is able to communicate over a bandwidth part (BWP) as large as 100 MHz bandwidth on low frequency bands and as large as 400 MHz bandwidth on high frequency bands.

The UE 110 can be configured to monitor downlink notification information as often as one ever 0.5 radio frames. Examples of downlink notification information may include paging information and/or other information that indicates a downlink transmission for the UE 110. The downlink notification information may be present in downlink control information (DCI).

The UE 110 can perform particular functions relating to connection maintenance and beam tracking, and RRM measurement can be done for multiple neighbour cells.

The UE 110 can support both: (i) scheduling free ("grant-free") resources in which time-frequency resources are configured in advance (e.g. via higher-layer signaling such as RRC signaling), and the resources are then used for uplink transmission of data from the UE 110, without the need for an explicit dynamic scheduling grant; and (ii) dynamically scheduled uplink transmissions in which a scheduling grant is transmitted from the base station 170 in DCI, and the UE 110 decodes the DCI to obtain the scheduling grant, which indicates the uplink time-frequency resource the UE 110 is to use to send its uplink data. Dynamic scheduling may require more power consumption by the UE 110, e.g. because of the effort to monitor and decode the DCI.

The UE 110 can support multiple subcarrier spacings (SCS): 15 KHz SCS and 30 kHz SCS for operation on low frequency bands, and 60 kHz SCS and 120 kHz SCS for operation on high frequency bands.

Even though the UE 110 has all of the capabilities listed above, communicating with maximum capability consumes more power. Therefore, a lower-power default operation mode is defined, as indicated in column 304 of FIG. 6. In this example default operation mode:

The UE 110 uses two receive antennas and one transmit antenna for operation on low frequency bands, and uses one panel for operation on high frequency bands.

The UE 110 communicates over a 5 MHz BWP on low frequency bands and over a 100 MHz BWP on high frequency bands. In some embodiments, the bandwidth of the BWP over which the UE 110 communicates in default operation mode may be the same as the bandwidth of the BWP used by the UE 110 when performing initial access.

The UE 110 monitors downlink notification information once every 256 radio frames.

The UE 110 uses one beam for beam tracking, and RRM measurement is performed for only one neighbour cell, or perhaps no RRM measurement at all for a neighbour cell.

The UE 110 only supports scheduling free ("grant-free") resources for uplink communications.

The UE 110 only supports 15 KHz or 30 KHz SCS for operation on low frequency bands, and 60 KHz or 120 kHz SCS for operation on high frequency bands.

Although not illustrated in the example in FIG. 6, some or all of the communication parameters in the default operation mode may be configurable. As one example, the number of receive and transmit antennas used in the default operation mode may be fixed, but the bandwidth of the BWP on which the UE 110 may communicate on low frequency bands may be configurable up to a maximum of 5 MHz. For example, a 1.25 MHz BWP or a 5 MHz BWP may be selected for low frequency bands in the default operation mode. In some embodiments, one or more communication parameters of the default operation mode may be modified/overwritten by UE-specific signal. As an example, the number of antenna ports and/or the bandwidth and/or the number of beams etc. may be overwritten by UE-specific signaling.

In some embodiments, the value of one or more communication parameters in the default operation mode may be based on the UE type. UE type may instead be called UE category or UE class or UE classification. The UE may identify its type to the base station 170, e.g. during initial access. Depending upon the capabilities associated with the UE type, the communication parameters in the default operation mode may be configured to have different values. For example, a UE that is relatively unsophisticated (e.g. a wireless sensor) may be configured to communicate on a 1.25 MHz BWP in default operation mode, and a UE that is more sophisticated (e.g. a mobile phone) may be configured to communicate on a 5 MHz BWP in default operation mode.

In some embodiments, the value of one or more communication parameters in the default operation mode may be based on application scenario. Different application scenarios may have different requirements. For example, if the data transmission relates to an application associated with low latency and high reliability (e.g. autonomous vehicle communication), then different UE capabilities may be required compared to if the data transmission instead relates to an application that is delay tolerant (e.g. downloading a web page from the Internet). A same UE could potentially have different data associated with different application scenarios, e.g. the UE may be a smart watch used to both monitor heart rate and video chat. Depending upon the capabilities required for the application scenario, one or more communication parameters in the default operation mode may be configured to have different values. For example, for a delay tolerant application (e.g. downloading a web page from the Internet), in default operation mode the UE 110 may be configured to receive on a narrow bandwidth and use two receive antennas. Whereas for a high reliability low latency application (e.g. autonomous vehicle communication), in default operation mode the UE 110 may be configured to receive on a wide bandwidth and use four receive antennas.

In some embodiments, the value of one or more communication parameters in the default operation mode may be based on service type. Service type may instead be called service category or service class or service classification. A service type is associated with a particular level of capability and/or quality of service, e.g. limited service (e.g. UE can only perform emergency communications such as emergency calls), normal service, high reliability service, low latency service, etc. Depending upon the capabilities required for the service type, the communication parameters in the default operation mode may be configured to have different values. For example, for a service type having a lower quality of service, the UE 110 may be configured to use one transmit and one receive antenna in the default operation mode, whereas for a service type having a higher quality of service, the UE 110 may be configured to use two transmit and two receive antennas in the default operation mode.

An enhanced power operation mode is also defined for the UE 110, as indicated in column 306 of FIG. 6. In the enhanced power operation mode:

The UE 110 uses all eight receive antennas and both transmit antennas for operation on low frequency bands, and uses both panels for operation on high frequency bands.

The UE 110 communicates over a 100 MHz BWP on low frequency bands and over a 400 MHz BWP on high frequency bands.

The UE 110 monitors downlink notification information at a periodicity that is configurable, but that may be as often as once every 0.5 radio frames. As an example, the UE 110 may be configured to monitor downlink notification information as often as once every 16, 8, 4, 2, 1, or 0.5 radio frames when in enhanced operation mode.

The UE 110 performs beam tracking multiple possible different ways (e.g. using multiple beams), up to the maximum capability of the UE 110, for example using 12 beams or 24 beams or 48 beams, etc.

The UE 110 can be configured to perform an RRM measurement for one or multiple neighbour cells, up to the maximum capability of the UE 110.

The UE 110 supports both scheduling free ("grant-free") resources and dynamically scheduled resources (in DCI) for uplink communications.

The UE 110 supports both 15 KHz and 30 KHz SCS for operation on low frequency bands, and both 60 kHz and 120 kHz SCS for operation on high frequency bands.

In the example in FIG. 6, some communication parameters are configurable in the enhanced power operation mode and others are not. For example, the number of transmit and receive antennas is not configurable, but the periodicity at which the UE 110 monitors for downlink notification information is configurable. This is only an example. It could be the case that none, some, or all of the communication parameters are configurable in the enhanced operation mode. In some embodiments, the configuration may be based on the UE type. For example, a UE that is relatively unsophisticated (e.g. a wireless sensor) may be configured to communicate uplink information using only scheduling free ("grant-free") resources, whereas a UE that is more sophisticated (e.g. a mobile phone) may be configured to support both scheduling free resources and resources dynamically scheduled via DCI. In some embodiments, the configuration may be based on application scenario. For example, for a delay tolerant application the UE 110 may be configured to monitor for downlink notification information once every 16 radio frames in enhanced operation mode, whereas for a low latency application the UE 110 may be configured to monitor for downlink notification information once every 0.5 radio frames in enhanced operation mode. In some embodiments, the configuration may be based on service type. For example, for a service type having a lower quality of service, the UE 110 may be configured to use one transmit and four receive antennas in the enhanced operation mode, whereas for a service type having a higher quality of service, the UE 110 may be configured to use two transmit and eight receive antennas in the enhanced operation mode. In some embodiments, one or more communication parameters of the enhanced operation mode may be modified/overwritten by UE-specific signal. As an example, the number of antenna ports and/or the bandwidth and/or the number of beams etc. may be overwritten by UE-specific signaling.

During operation, the UE 110 may operate in default operation mode 304, thereby consuming less power. The UE 110 may temporarily switch to enhanced operation mode 306 on an on-demand basis, e.g. in response to a trigger, as described in more detail later.

FIG. 7 illustrates a variation of FIG. 6 in which there is more than one operation mode. Operation mode 1 (i.e. first operation mode) is the default operation mode and consumes the least amount of power. Operation mode 2 (i.e. second operation mode) is associated with increased UE capabilities and consumes more power. Operation mode 3 (i.e. third operation mode) is associated with UE capabilities that are even further increased and consumes the most power. The UE 110 may operate in operation mode 1 by default, and switch to operation mode 2 and/or operation mode 3 on an on-demand basis, e.g. in response to a trigger.

Only some of the communication parameters are shown as being configurable in FIG. 7. In general, for each of the three operation modes, none, some, or all of the values of the communication parameters may be configured. In some embodiments, the configuration may be based on UE type and/or application scenario and/or service type. In some embodiments, one or more parameters of an operation mode (e.g. one or more parameters of an enhanced operation mode) may be modified/overwritten by UE-specific signal. As an example, the number of antenna ports and/or the bandwidth and/or the number of beams etc. may be overwritten by UE-specific signaling.

In some embodiments, the base station 170 may instruct the UE 110 as to the operation mode to which the UE 110 is to switch when switching out of the default operation mode. For example, in some situations the base station 170 may transmit a signal to the UE 110 instructing the UE 110 to switch from operation mode 1 into operation mode 2, and in other situations the base station 170 may transmit a signal to the UE 110 instructing the UE 110 to switch from operation mode 1 into operation mode 3. In other embodiments, the UE 110 decides whether it should switch from operation mode 1 to operation mode 2 or instead to operation mode 3 based on a trigger, e.g. based on the presence of particular data to be transmitted from the UE 110 to the base station 170. For example, if data associated with a low latency high reliability application arrives at the buffer of UE 110 for uplink transmission, then the UE 110 may switch from operation mode 1 to operation mode 3 in order to transmit that data. Upon finishing transmitting the data, the UE 110 may switch back to operation mode 1. If data associated with a delay tolerant application arrives at the buffer of UE 110 for uplink transmission, then the UE 110 may switch from operation mode 1 to operation mode 2 in order to transmit that data, and then switch back to operation mode 1 upon completion of the transmission.

FIG. 8 illustrates a variation of FIG. 6 in which there is more than one default operation mode. The default operation mode for the UE 110 depends upon the UE type and/or the application scenario and/or the service type. For example, a UE 110 associated with a delay tolerant application may operate in default operation mode 1, and a UE 110 associated with a low latency application may operate in default operation mode 2. Although not shown in FIG. 8, there may also or instead be multiple enhanced operation modes, which may be dependent upon UE type and/or application scenario and/or service type. Also, only some of the communication parameters are shown as being configurable in FIG. 8. In general, for each of the three operation modes, none, some, or all of the values of the communication parameters may be configured. In some embodiments, the configuration may be based on UE type and/or application scenario and/or service type. In some embodiments, one or more parameters of an operation mode may be modified/overwritten by UE-specific signal.

Note that the communication parameters discussed above and illustrated in relation to FIGS. 6 to 8 are only example communication parameters. A UE may have fewer, more, or different communication parameters from those discussed above and illustrated in relation to FIGS. 6 to 8. As one example, a UE 110 may not have panels if the UE 110 only communicates on low frequency bands. As another example, additional communication parameters that the UE 110 may have, and which are not discussed above, may include: number of component carriers used by the UE 110 (e.g. a UE 110 in enhanced mode may communicate over more component carriers); decoding algorithm used by UE 110 (e.g. a UE 110 in enhanced mode may implement a more robust error correction decoding algorithm); HARQ processing time capability (e.g. a UE 110 in default mode may support 7 OFDM symbols for decoding data and receiving DCI, whereas a UE 110 in enhanced mode may support 3.5 OFDM symbols for decoding data and receiving DCI); transmission power used by the UE (e.g. a UE 110 in enhanced mode may communicate with more transmission power); type and/or number of measurements performed by the UE 110; level of synchronization maintenance performed by the UE 110 (e.g. for timing, frequency, and/or beam synchronization); level at which the UE 110 monitors and decodes dynamic control signaling; type of control channels monitored by the UE (e.g. monitoring for higher-layer signaling, such as RRC signaling, versus also or instead monitoring for signaling in DCI); search space used by UE 110; multiple-input multiple-output (MIMO) scheme implemented by the UE 110; etc. In some embodiments, the value of one, some or all of the communication parameters for one or more of the operation modes may be:

- Predefined, e.g. fixed in a standard, and stored in memory. For example, one or more of the example tables in FIGS. 6 to 8 may be stored in memory 208 of the UE 110. In some embodiments, the value of one or more of the communication parameters for one or more of the operation modes may be predefined (e.g. fixed in a standard) based on the UE type and/or application scenario and/or service type. In other embodiments, the value of one or more of the communication parameters for one or more of the operation modes is predefined and independent of the UE type and/or application scenario and/or service type.
- Signaled, e.g. by higher-layer signaling (such as RRC signaling) and/or by DCI signaling. In some embodiments, the value of one or more of the communication parameters for one or more of the operation modes may be signaled during initial access. In some embodiments, different communication parameter values may be signaled based on the UE type and/or application scenario and/or service type. In some embodiments, the signaling may be UE-specific signaling or broadcast signaling or groupcast/multicast signaling.

In some embodiments, the value of one or more communication parameters may be predefined (e.g. fixed in a standard) and the value of other communication parameters may be configured using signaling (e.g. RRC signaling and/or in DCI, or MAC CE). As an example, the number of antennas and bandwidth of BWP over which the UE 110 may communicate may be predefined, and other communication parameters configured using signaling.

In some embodiments, the value of one or more communication parameters for one or more operation modes may be selected by the UE 110, e.g. possibly based on UE type and/or application scenario and/or service type.

Switching Between Operation Modes

In some embodiments, switching from the lower power default operation mode to a higher power enhanced operation mode may be performed by the UE 110 in response to a trigger. One example of a trigger is arrival of data for transmission by the UE 110. For example, the buffer status of the transmission buffer for the UE 110 may indicate that data has arrived for uplink transmission to the network, which triggers switching from the default operation mode to the enhanced operation mode in order to transmit that data. In some embodiments, the UE 110 might only switch to the enhanced operation mode if the data for transmission is associated with a particular service requirement and/or a particular application scenario (e.g. the data is associated with a high reliability low latency application or service).

Another example of a trigger that may cause the UE 110 to switch from the lower power default operation mode to a higher power enhanced operation mode is receipt of signaling from the base station 170, where the signaling explicitly or implicitly instructs the UE 110 to switch to the enhanced operation mode. For example, the network may determine that there is data to be transmitted from the base station 170 to the UE 110, and/or that the UE 110 is associated with a particular UE type and/or application scenario and/or service type. In response, the base station 170 may transmit an instruction to the UE 110 that explicitly instructs the UE 110 to enter the enhanced operation mode. In some embodiments, the base station 170 might only instruct the UE 110 to switch to the enhanced operation mode if the data for downlink transmission to the UE 110 is associated with a particular service requirement and/or a particular application scenario (e.g. the data is associated with a high reliability low latency application or service). In some embodiments, the UE 110 may monitor for and receive downlink signaling indicating that data has been or will be transmitted from the network to the UE 110. In response to receiving the downlink signaling, the UE 110 may switch to the enhanced operation mode. As an example, the downlink signaling may be a scheduling grant in DCI that schedules a downlink transmission of data to the UE 110. The receipt of the downlink scheduling grant may act as a trigger for the UE 110 to switch to the enhanced operation mode. As another example, the downlink signaling may be a paging signal, and the receipt of the paging signal may act as a trigger for the UE 110 to switch to the enhanced operation mode.

Another example of a trigger that may cause the UE 110 to switch from the lower power default operation mode to a higher power enhanced operation mode is channel quality, e.g. quality of the channel between the UE 110 and the base station 170. For example, if the measurement of channel quality indicates that channel quality has dropped below a particular threshold, the UE 110 may switch to the higher power enhanced operation mode. The value of the particular threshold may be predefined (e.g. fixed in a standard) or configured by the UE 110 and/or by the base station 170.

In some embodiments, the UE 110 may switch from the default operation mode into one of multiple possible different operation modes, each operation mode having a respective different associated power consumption (like the example in FIG. 7). In some embodiments, the mode into which the UE 110 switches may be based on the UE type and/or application scenario and/or service type. For example, if the switch is to transmit or receive data associated with a low latency high reliability service, the UE 110 may switch into an operation mode having the highest UE capabilities (and associated with the highest power consumption).

In some embodiments, in response to another trigger the UE 110 switches back to the default operation mode. For example, the UE 110 may have switched to the enhanced operation mode in order to transmit or receive data, and the trigger to switch back to default operation mode may be that the data is finished being transmitted or received. For example, the trigger may be the absence of that data, and/or the end of the scheduled time duration for sending or receiving that data.

Another example of a trigger that may cause a return to the lower power default operation mode may be expiry of a timer. For example, the UE 110 may start a timer upon switching to the enhanced operation mode. When the timer expires, the UE 110 returns to the default operation mode. The duration of the timer (from when it starts to expiry) may be set at a value that ensures that the UE 110 does not stay out of the default operation mode too long. The duration of the timer may be set by the UE 110 or the network (e.g. via signaling from the base station 170). The duration of the timer may be configurable.

Another example of a trigger that may cause the UE 110 to return to the lower power default operation mode is receipt of signaling from the base station 170, where the signaling implicitly or explicitly instructs the UE 110 to switch back to the default operation mode. For example, upon completion of a downlink transmission to the UE 110, the base station 170 may transmit signaling to the UE 110 that instructs the UE 110 to return to the default operation mode. An example of an implicit instruction to switch back to the default operation mode may be receipt of an ACK for data transmitted in the enhanced operation mode.

Another example of a trigger that may cause the UE 110 to return to the lower power default operation mode is channel quality, e.g. quality of the channel between the UE 110 and the base station 170. For example, if the measurement of channel quality indicates that channel quality is above a particular threshold, the UE 110 may switch back to the lower power default operation mode. The value of the particular threshold may be predefined (e.g. fixed in a standard) or configured by the UE 110 and/or by the base station 170.

In some embodiments, the switching out of the default operation mode and/or the switching back to the default operation mode may be triggered based on timing, e.g. based on the start of a frame, subframe, slot, etc. In some embodiments, the switching may be based on a predefined or configured switching pattern.

In some embodiments, when the UE 110 has data to transmit to the base station 170, and the UE 110 wants to boost its capability by switching to an enhanced operation mode, the UE 110 performs the following operations. The UE 110 does not switch to the enhanced operation mode right away, but instead (in the default operation mode) initially transmits some of the data to the base station 170, along with an indication of one or more of the values for the communication parameters for the enhanced operation mode. The UE 110 then waits for a response from the base station 170 (e.g. signaling from the base station 170) that acknowledges receipt of the indication of the values of the communication parameters for the enhanced operation mode. The response may be an explicit acknowledgment or an implicit acknowledgement (e.g. an instruction to switch to the enhanced operation mode). The response acts as the trigger to switch to the enhanced operation mode to transmit the remaining data to the base station 170. In this way, the UE 110 may select and indicate to the base station 170 the communication parameter values the UE 110 will utilize in the enhanced operation mode, before the UE 110 switches to the enhanced operation mode. This may allow for the UE 110 to select between multiple possible communication parameter values and inform the base station 170 accordingly.

In some embodiments, when the UE 110 has data to transmit to the base station 170, and the UE 110 wants to boost its capability by switching to an enhanced operation mode, the UE 110 performs the following operations. The UE 110 does not switch to the enhanced operation mode right away, but instead remains in the default operation mode and first transmits a request to the base station 170. The request asks permission for the UE 110 to switch to the enhanced operation mode. The request could be implicit (e.g. a scheduling request). The base station 170 replies with a response indicating that the UE 110 has permission to switch to the enhanced operation mode. The response could be implicit (e.g. a scheduling grant). The response acts as a trigger: upon receiving the response, the UE 110 switches from the default operation mode to the enhanced operation mode. Once the UE 110 has entered the enhanced operation mode, the UE 110 then begins transmitting the data. In some embodiments, the request indicates the value of one or more communication parameters that will be used by the UE 110 in the enhanced operation mode, e.g. if the UE 110 has the ability to select between multiple possible communication parameter values. In some embodiments, the response from the base station 170 indicates the value of one or more communication parameters that are to be used by the UE 110 in the enhanced operation mode, e.g. if the network has the ability to configure multiple possible communication parameter values. In some embodiments, the response initiates a timer, and the expiry of the timer acts as a trigger for the UE 110 to switch from the enhanced operation mode back to the default operation mode. In some embodiments, the timer may be implemented at the UE 110, e.g. the response triggers a timer at the UE 110 to start counting, and when the timer has expired the UE 110 switches back to the default operation mode. In some embodiments, the timer may be implemented by the base station 170, e.g. the response triggers a timer at the base station 170 to start counting, and when the timer has expired the base station 170 transmits a message to the UE 110 instructing the UE 110 to switch back to the default operation mode. In some embodiments, a timer on the network and UE side may respectively count and expire in synchronization, e.g. so that the UE 110 can switch back to the default operation mode without the base station 170 sending an explicit instruction to the UE 110, and so that the base station 170 knows when the UE 110 has switched back to operating in the default operation mode.

Example Methods

Figure 9:
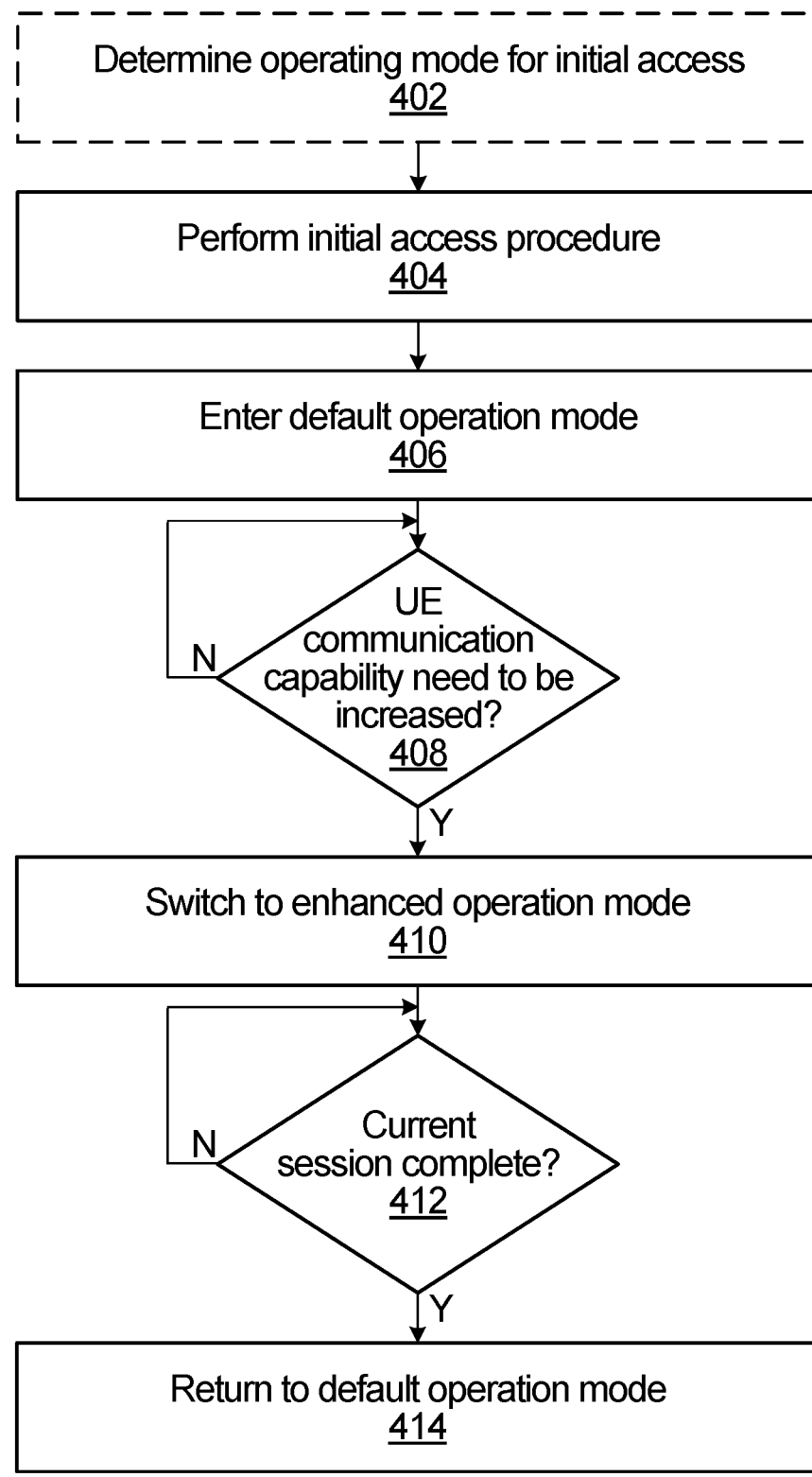
FIGS. 9 to 11 are methods performed according to various embodiments.

FIG. 9 illustrates an example method performed by UE 110, according to one embodiment.

At step 402, the UE 110 determines the operation mode in which the UE 110 will operate in order to perform initial access to connect to the network. Step 402 is optional in that the UE 110 could be preconfigured to always use the same operation mode to perform initial access, e.g. always use the default operation mode or always use an enhanced operation mode in which the UE 110 has full communication capability. However, in some embodiments the UE 110 may have a choice as to the operation mode in which the UE 110 will operate in order to perform initial access. In some embodiments, the choice of operation mode may be based on UE type and/or expected or known application scenario and/or service type. For example, if the UE 110 is known or expected to be associated with a low latency application or service, then the UE 110 may operate in the enhanced operation mode in order to perform initial access more quickly and/or more reliably (e.g. using multi-carrier access, wideband, etc.). On the other hand, if the UE 110 is known or expected to be associated with a delay tolerant best effort application scenario and/or application type, then the UE 110 may perform initial access in the default operation mode to conserve power (e.g. use narrow band communication, lower transmission power, etc.). In some embodiments, the amount of power available to the UE at power-up may determine the operation mode in which the UE 110 operates in order to perform initial access. In some embodiments, a user of the UE 110 may configure the UE 110 to use a particular operation mode to perform initial access.

At step 404, the UE 110 performs an initial access procedure in order to connect to the network. Initial access is the process of performing initial steps prior to the UE 110 receiving or transmitting user data, e.g. synchronization, derivation of system information, and random access. The initial access procedure may be implementation specific, but in some embodiments may be performed as follows: the UE 110 searches for one or more synchronization signals, e.g. a primary synchronization signal (PSS) and a secondary synchronization signal (SSS); the UE 110 decodes a physical broadcast channel (PBCH) to read a master information block (MIB) in order to obtain necessary system information; information in system information blocks (SIBs) are also read; the UE 110 performs a random access procedure.

At step 406, upon completing the initial access procedure, the UE 110 enters the default operation mode. In some embodiments, the communication parameter values for the default operation mode are predefined (e.g. fixed in a standard). In other embodiments, some or all of the communication parameter values for the default operation mode are obtained during or after initial access in step 404. For example, during initial access the base station 170 may transmit signaling to the UE 110 that configures one or more values of the communication parameters for the default operation mode and/or for the enhanced operation mode, For example, the signaling to configure one or more values of the communication parameter can be carried in MIB, SIB or RAR (RACH response) during the initial access procedure.

In some embodiments, the signaling to configure or update one or more values of one or more of the communication parameters can be carried in RRC signaling or DCI when the UE is connected to the network (or in default operation mode).

In the default operation mode, the UE 110 wirelessly communicates with the base station 170 using the communication parameters associated with the default operation mode (e.g. the parameters in column 304 in the example in FIG. 6). In some embodiments, the default operation mode consumes less power than any other operation mode used by the UE 110 to communicate with the base station 170 after the initial access.

At step 408, the UE 110 determines whether its communication capability needs to be increased. If not, the UE 110 remains in default operation mode and step 408 repeats. However, if the communication capability of the UE 110 is to be increased, then the method proceeds to step 410. The UE 110 determines that its communication capability needs to be increased based on a trigger, as described earlier (e.g. based on the arrival of data to be transmitted to the base station 170 or in response to particular downlink signaling from the base station 170).

At step 410, the UE 110 switches to the enhanced operation mode in response to the trigger. In the enhanced operation mode, the UE 110 wirelessly communicates with the network device using a different set of communication parameters associated with higher power consumption but also higher UE communication capability (e.g. the parameters in column 306 in the example of FIG. 6).

At step 412, the UE 110 determines whether the current session in enhanced operation mode is complete. If not, the UE 110 remains in the enhanced operation mode and step 412 repeats. However, if the UE 110 determines that the current session in enhanced operation mode is complete, then the method proceeds to step 414. The UE 110 determines that the current session in enhanced operation mode is complete based on a trigger, as described earlier (e.g. the completion of the data transmission or in response to an expiry of a timer or in response to particular downlink signaling from the base station 170).

At step 414, the UE 110 returns to its default operation mode.

Figure 10:
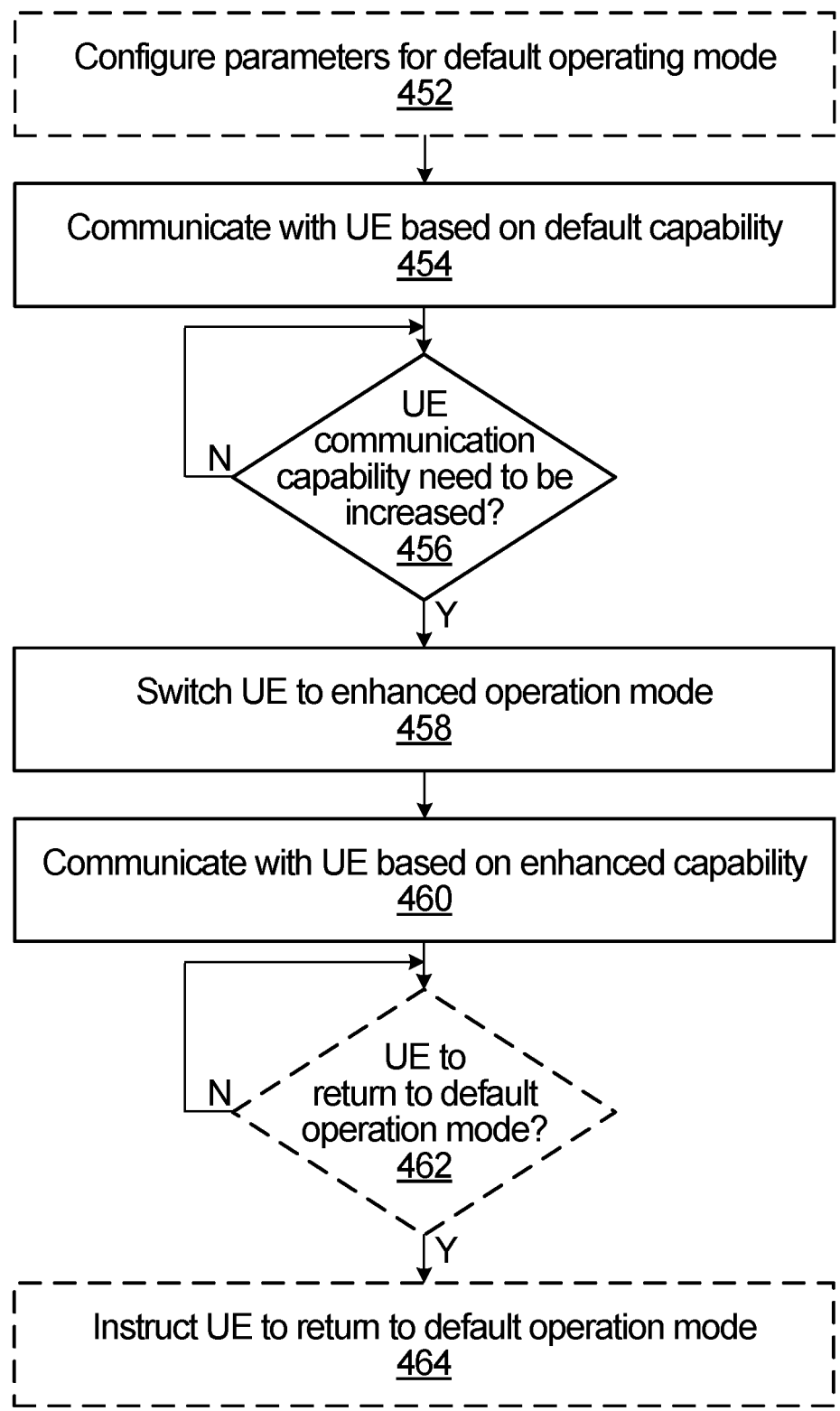

FIG. 10 illustrates an example method performed by base station 170, according to one embodiment.

At step 452, the base station 170 transmits a configuration of communication parameters to the UE 110, which are to be used by the UE 110 in default operation mode. For example, step 452 may be performed during or just after initial access. Step 452 is optional because in some embodiments the communication parameters may be predefined, e.g. fixed in a standard and therefore known in advance by both the base station 170 and the UE 110. In some embodiments, optional step 452 may also or instead include configuring one or more operation modes, including possibly configuring one or more communication parameter values for one or more enhanced and/or default operation modes.

At step 454, the base station 170 initially wirelessly communicates with the UE 110 based on the default communication capability of the UE 110, i.e. based on the UE 110 being in default operation mode. Wirelessly communicating with the UE 110 may include scheduling uplink and/or downlink data transmissions. The uplink and/or downlink transmissions are based on the UE 110's capabilities in default operation mode. For example, if in default operation mode the UE 110 only uses 15 kHz subcarrier spacing and only communicates on a narrow band, then the base station 170 will communicate with the UE 110 on that basis, e.g. over that narrow band and using the 15 KHz subcarrier spacing.

At step 456, the base station determines whether the communication capabilities of the UE 110 need to be increased, i.e. whether the UE 110 needs to be switched to an enhanced operation mode. Step 456 repeats until the base station determines that the communication capabilities of the UE 110 need to be increased, in which case the method proceeds to step 458. The base station 170 may determines that the communication capabilities of the UE 110 need to be increased based on one of the events/triggers described earlier. For example, the base station 170 may determine that the communication capabilities of the UE 110 need to be increased because the base station 170 has received a request from the UE 110 asking permission to switch to an enhanced operation mode. In some embodiments, the request for permission may be implicit, e.g. in the form of a scheduling request. As another example, the base station 170 may determine that the communication capabilities of the UE 110 need to be increased because the base station 170 has received an uplink data transmission from the UE 110 in default operation mode, but the uplink data transmission also explicitly or implicitly requests permission to switch to an enhanced operation mode. The request may optionally indicate one or more communication parameter values for the enhanced operation mode. As another example, the base station 170 may determine that the communication capabilities of the UE 110 need to be increased because data for downlink transmission to the UE 110 has arrived at the base station 170. The downlink data may be associated with a particular application scenario and/or service type (e.g. it is low latency data)

At step 458, the base station 170 sends an instruction to the UE 110 to switch the UE 110 to the enhanced operation mode. In some embodiments, the instruction may include a configuration of one or more communication parameter values for the UE 110 for the enhanced operation mode, e.g. if the communication parameter values can be configured by the base station 110.

At step 460, the base station 170 wirelessly communicates with the UE 110 based on the enhanced communication capability of the UE 110, i.e. based on the UE 110 being in enhanced operation mode. Wirelessly communicating with the UE 110 may include scheduling uplink and/or downlink data transmissions. The uplink and/or downlink transmissions are based on the UE 110's capabilities in enhanced operation mode. For example, if in enhanced operation mode the UE 110 communicates on a wide band and supports both 15 kHz and 30 kHz subcarrier spacing, then the base station 170 will communicate with the UE 110 on that basis, e.g. over the wide band and using the 15 KHz or 30 kHz subcarrier spacing.

At step 462, the base station determines whether the UE 110 should return to default operation mode. Step 462 repeats until the base station determines that the UE 110 should return to default operation mode. The base station 170 may determine that the UE 110 should return to default operation mode based on any of the ways described earlier. For example, a timer may have been started upon instructing the UE 110 to enter enhanced operation mode, and the base station 170 may determine that the UE 110 should return to default operation mode in response to the timer expiring. As another example, base station 170 may determine that the UE 110 should return to default operation mode in response to a particular data transmission being finished, e.g. at the end of a particular downlink transmission (which may have been dynamically scheduled or present in scheduling free resources), or in response to the end of a particular uplink data transmission from the UE 110 (which may have been dynamically scheduled or present in scheduling free resources). As another example, the base station 170 may determine that the UE 110 should return to default operation mode in response to the UE 110 sending a message to the base station 170 requesting permission to return to the default operation mode.

At step 464, the base station 170 instructs the UE 110 to return to default operation mode.

Steps 462 and 464 may be optional, e.g. if the UE 110 knows to switch back to default operation mode without requiring an explicit indication from the base station 170, e.g. if the UE 110 automatically returns to default operation mode upon expiry of a timer at the UE 110 or automatically upon completion of a particular data transmission to or from the base station 170.

Figure 11:
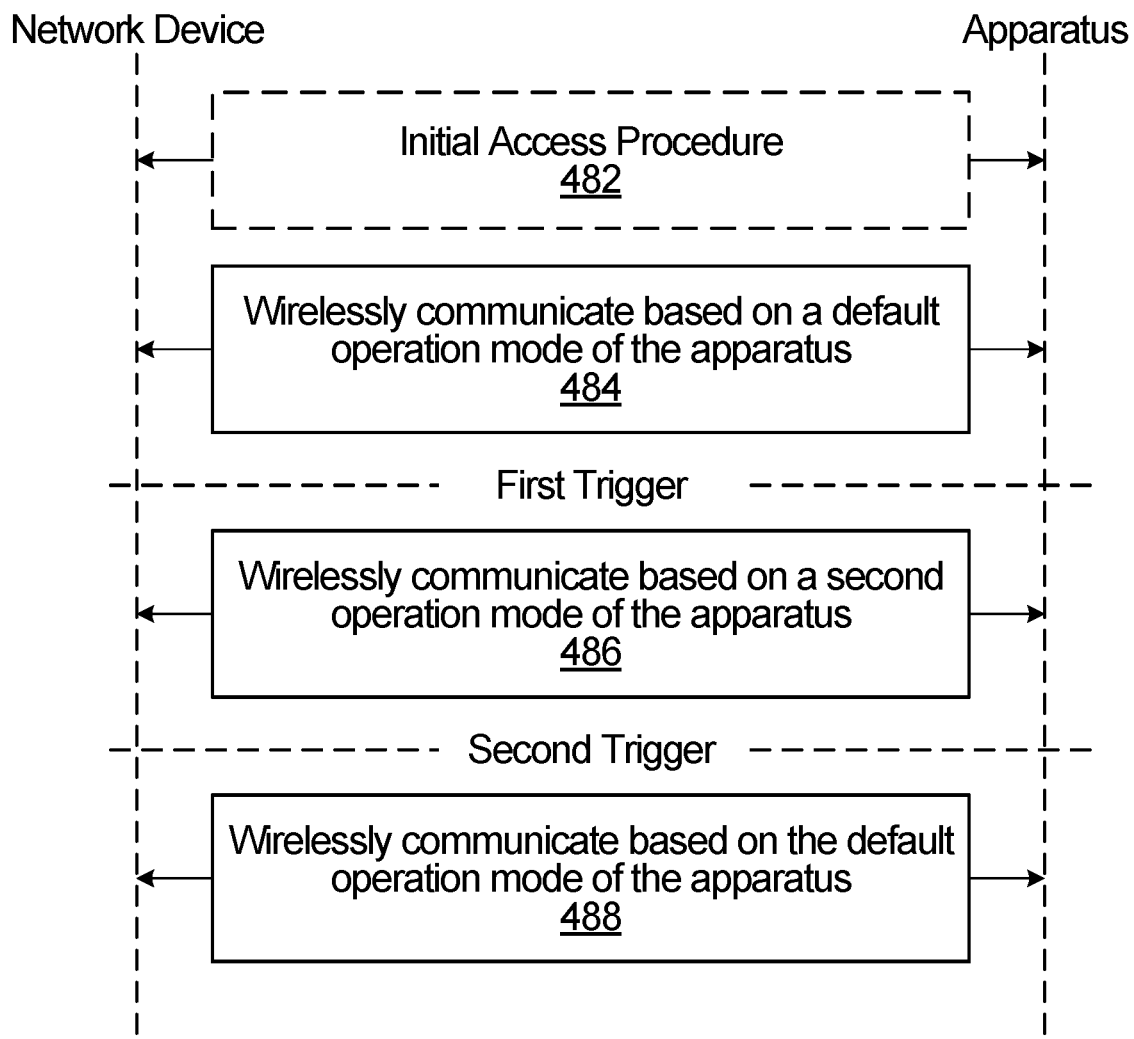

FIG. 11 illustrates an example method performed by a network device (e.g. base station 170) and an apparatus (e.g. UE 110), according to another embodiment.

At step 482, an initial access procedure is performed so that the apparatus can connect to the network. Step 482 is optional if the method begins post-initial access. At step 484, the apparatus and network device wirelessly communicate based on a default operation mode of the apparatus. The default operation mode is alternatively referred to as a first operation mode and is a lower power mode and is associated with reduced capabilities of the apparatus. The apparatus has a set of default communication parameters utilized by the apparatus in the default operation mode (e.g. the default communication parameters in column 304 of FIG. 6). The network device stores an indication of one, some, or all of the default communication parameters in its memory and wirelessly communicates with the apparatus based on those indicated default communication parameters. For example, if the apparatus only communicates over a 5 MHz bandwidth BWP in default operation mode, then the network device communicates with the apparatus on that BWP.

In response to a first trigger, at step 486 the network device and apparatus begin instead wirelessly communicating based on a second operation mode of the apparatus. Examples of the first trigger are described herein and may include: presence of data for uplink transmission to the network device, where the data might or might not be associated with a particular application scenario or service requirement; presence of data for downlink transmission to the apparatus, where the data might or might not be associated with a particular application scenario or service requirement; presence of particular downlink signaling (e.g. an explicit instruction to switch to the second operation mode or a scheduling grant); etc.

The second operation mode is a higher power mode and is associated with enhanced capabilities of the apparatus. The apparatus has a second set of communication parameters utilized by the apparatus in the second operation mode (e.g. the communication parameters in column 306 of FIG. 6). The network device stores an indication of one, some or all of the second set of communication parameters in its memory and wirelessly communicates with the apparatus based on those indicated communication parameters. For example, if the apparatus communicates over a 100 MHz bandwidth BWP in the second operation mode, then the network device communicates with the apparatus on that BWP.

In response to a second trigger, at step 488 the network device and apparatus return to wirelessly communicating based on the default operation mode of the apparatus. Examples of the second trigger are described herein and may include: completion of uplink transmission of particular data to the network device, where the data might or might not be associated with a particular application scenario or service requirement; completion of downlink transmission of particular data to the apparatus, where the data might or might not be associated with a particular application scenario or service requirement; presence of particular downlink signaling (e.g. an instruction to switch to the default operation mode); expiry of a timer; etc.

The embodiments above have thus far been described in the context of the UE operating in different operation modes, with each operation mode associated with a respective different set of UE capabilities and a respective different power consumption. However, the methods described herein may also or instead apply to operation of the network device. For example, base station 170 may have different operation modes, such as a lower power default operation mode and an enhanced power operation mode, which may complement the operation modes of the UE 110. If the UE 110 does not switch between RRC states, then the base station 170 also does not have associated RRC states. In some embodiments, the network device and UE 110 may operate having regard to joint power consumption optimization, e.g. the UE 110 and base station 170 may together operate in respective default operation modes that on the whole aim to reduce or minimizes power consumption when considered across the two devices.

Further embodiments are described in view of and in addition to the foregoing.

In some embodiments, a method is disclosed that is performed by an apparatus. For example, the method may be performed by UE 110. The method may include operating in a default operation mode in which the apparatus wirelessly communicates with a network device (e.g. base station 170) using a first set of communication parameters. The default operation mode may be referred to as a first operation mode. The first set of communication parameters may be default communication parameters. An example of default communication parameters are the communication parameters illustrated in column 304 of FIG. 6. Operating in the default operation mode may begin after or upon completion of an initial access procedure (e.g. immediately after initial access before the apparatus operates in any of the other possible operation modes). In some embodiments, the default operation mode is one of at least two operation modes, where the at least two operation modes includes a second operation mode. An example of a second operation mode may be the enhanced operation mode described earlier. The second operation mode consumes more power than the default operation mode. Note that when one operation mode is said to consume more or less power than another operation mode, a direct comparison is assumed, e.g. for a same communication function, behaviour, and/or duration of time.

In some embodiments, the operation modes may be operation modes all within or of a single RRC state.

In some embodiments, the default operation mode consumes less power than any other operation mode used by the apparatus to communicate with the network device after the initial access.

In some embodiments, switching from operating in the default operation mode to instead operating in the second operation mode, and/or switching from operating in the second operation mode back to operating in the default operation mode occurs without switching RRC states. For example, as explained earlier, the apparatus may operate in a single same RRC state, which means that there are power savings associated with not switching between different RRC states.

In some embodiments, the method includes, in response to a first trigger, operating in the second operation mode instead of the default operation mode. In the second operation mode, the apparatus wirelessly communicates with the network device using a second set of communication parameters. The second set of communication parameters are different from the first set of communication parameters. An example is FIG. 6, where the second set of communication parameters are shown in column 306. These communication parameters are different from the first (default) set of communication parameters shown in column 304 of FIG. 6.

In some embodiments, the first trigger is at least one of: arrival of data for transmission by the apparatus (where the data might or might not be associated with a particular service requirement and/or a particular application scenario); a channel measurement value being above or below a particular threshold (e.g. the channel between the apparatus and the network device degrading such that the channel measurement indicates channel quality below a particular threshold); receipt of signaling from the network device. The signaling may be signaling instructing the apparatus to switch to the second operation mode. The instruction may be explicit or implicit. Examples of implicit instructions includes: a scheduling grant scheduling an uplink or downlink transmission; a notification that there is downlink data for transmission to the apparatus; an acknowledgement. Examples of acknowledgement may include: a HARQ ACK/NACK acknowledgement (e.g. the network device sends a NACK if the original data transmission in the default operation mode failed, which triggers a retransmission in the second operation mode); an acknowledgement of a request made by the apparatus, such as a request to switch to the second operation mode; an acknowledgement of one or more communication parameters indicated by the apparatus; etc.

In some embodiments, the first trigger comprises the receipt of signaling from the network device, and the signaling also configures at least one of the second set of communication parameters.

In some embodiments, the method further includes, in response to a second trigger, returning to operating in the default operation mode.

In some embodiments, the second trigger is at least one of: absence of the data for transmission from the apparatus (e.g. the apparatus has finished transmitting the data that was to be transmitted in the second operation mode); expiry of a timer; the channel measurement value being above or below a particular threshold (e.g. the channel between the apparatus and the network device improving such that the channel measurement indicates channel quality above a particular threshold); receipt of second signaling from the network device. In some embodiments, the second signaling instructs the apparatus to return to the default operation mode. The second signaling may be explicit or implicit. Examples of implicit signaling include: HARQ feedback (e.g. receipt of an ACK for data may trigger the apparatus to switch back to the default operation mode); a new configuration, which may be associated with returning back to the default operation mode.

In some embodiments, in response to the first trigger, the method includes operating in the default operation mode to transmit, to the network device, both first data and an indication of at least one of the second set of communication parameters. The method may further include operating in the default operation mode to receive, from the network device, signaling acknowledging receipt of the indication of the at least one of the second set of communication parameters. In some embodiments, subsequent to receiving the signaling acknowledging receipt, the method includes operating in the second operation mode to transmit second data to the network device.

In some embodiments, in response to the first trigger the method includes operating in the default operation mode to transmit, to the network device, a request to operate in the second operation mode. The method may further include operating in the default operation mode to receive, from the network device, signaling granting permission to operate in the second operation mode. In some embodiments, subsequent to receiving the signaling granting permission to operate in the second operation mode, the method includes operating in the second operation mode to transmit data to the network device. In some embodiments, in response to receiving the signaling granting permission to operate in the second operation mode, the method further includes starting a timer. The second trigger may then be expiry of the timer.

In some embodiments, the method further includes receiving a message from the network device, the message configuring at least one of the first set of communication parameters and/or at least one of the second set of communication parameters. In some embodiments, the message is received during the initial access procedure. In some embodiments, at least one of the first set of communication parameters and/or at least one of the second set of communication parameters is configured using RRC signaling and/or using DCI. In some embodiments, at least one of the first set of communication parameters and/or at least one of the second set of communication parameters is dependent upon service type and/or application scenario and/or apparatus type.

An apparatus is also configured to perform any of the apparatus methods above. For example, the apparatus may include a processor and a memory. The memory may include processor-executable instruction that, when executed by the processor, cause the processor to control the apparatus to perform the methods. In some embodiments, the apparatus may include a memory to store an indication of the first set of communication parameters associated with the default operation mode and/or to store an indication of the second set of communication parameters associated with the second operation mode. In some embodiments, the processor instructs the apparatus to perform the method steps performed by the apparatus. For example, the processor may instruct the apparatus to operate in the default operation mode in which the apparatus wirelessly communicates with the network device using the first set of communication parameters. As another example, the processor may instruct the apparatus to operate in the second operation mode in which the apparatus wirelessly communicates with the network device using the second set of communication parameters. A processor 'instructs' the apparatus by issuing one or more instructions that control the apparatus to perform the method steps. For example, to instruct the apparatus to operate in the default operation mode, the processor controls the apparatus to communicate (using the transmitter and receiver) in accordance with the first set of communication parameters, e.g. if the transmitter is to transmit on just one transmit antenna then the processor prepares the communication on that basis and instructs the transmitter to only transmit on one transmit antenna. Similarly, to instruct the apparatus to operate in the second operation mode, the processor controls the apparatus to communicate (using the transmitter and receiver) in accordance with the second set of communication parameters, e.g. if the transmitter is to transmit on two transmit antennas then the processor prepares the communication on that basis and instructs the transmitter to transmit on the two transmit antennas.

In some embodiments, a method is disclosed that is performed by a network device. For example, the method may be performed by base station 170. The method may include wirelessly communicating with an apparatus (e.g. UE 110) based on a default operation mode of the apparatus. The default operation mode may be associated with a default communication capability of the apparatus. The default communication capability of the apparatus is associated with a default set of communication parameters used by the apparatus to communicate with the network device in the default operation mode. For example, the default set of communication parameters may be those illustrated in column 304 of FIG. 6. The default operation mode may be associated with a lower power consumption (e.g. by the apparatus, by the network device, or by both the apparatus and the network device). Wirelessly communicating with the apparatus based on the default operation mode means wirelessly communicating according to at least some of the apparatus's capabilities in default operation mode. For example, if in default operation mode the apparatus only uses 15 kHz subcarrier spacing and only communicates on a single BWP having a 20 MHz bandwidth, then the network device communicates with the apparatus on that basis, e.g. over the single BWP of 20 MHz bandwidth and using the 15 KHz subcarrier spacing.

In some embodiments, the wirelessly communicating with the apparatus based on the default operation mode of the apparatus may be performed after or on completion of the initial access procedure (e.g. immediately after initial access before the apparatus operates in any of the other possible operation modes).

In some embodiments, in response to a first trigger, the method includes instead wirelessly communicating with the apparatus based on a second operation mode of the apparatus. The second operation mode may be associated with a second communication capability of the apparatus. The second communication capability of the apparatus is associated with a second set of communication parameters used by the apparatus to communicate with the network device in the second operation mode. For example, the second set of communication parameters may be those illustrated in column 306 of FIG. 6. The second operation mode may be associated with a higher power consumption (e.g. by the apparatus, by the network device, or by both the apparatus and the network device). Wirelessly communicating with the apparatus based on the second operation mode means wirelessly communicating according to at least some of the apparatus's capabilities in second operation mode. For example, if in second operation mode the apparatus uses 30 kHz subcarrier spacing and communicates on a single BWP having a 100 MHz bandwidth, then the network device communicates with the apparatus on that basis, e.g. over the BWP of 100 MHz bandwidth and using the 30 KHz subcarrier spacing.

In some embodiments, in response to a second trigger, the method may further include returning to wirelessly communicating with the apparatus based on the default operation mode of the apparatus.

In some embodiments, switching from wirelessly communicating with the apparatus based on the default operation mode to instead wirelessly communicating with the apparatus based on the second operation mode, and/or switching from wirelessly communicating with the apparatus based on the second operation mode to instead wirelessly communicating with the apparatus based on the default mode occurs without a switch of RRC states.

In some embodiments, the first trigger is at least one of: arrival of data for transmission to the apparatus; a channel measurement value being above or below a particular threshold (e.g. the channel between the apparatus and the network device degrading such that the channel measurement indicates channel quality below a particular threshold); receipt of a request from the apparatus. The request from the apparatus may be explicit or implicit. An example of an explicit request is a request that asks permission for the apparatus to operate in the second operation mode. Examples of implicit requests include: an uplink transmission of data from the apparatus (which may or may not include an indication of a configuration of one or more of the second set of communication parameters); a scheduling request; HARQ feedback (e.g. a NACK, which may act as a trigger to retransmit based on the second operating mode). In some embodiments, in response to receiving the request, a response is sent to the apparatus that instructs the apparatus to operate in the second operation mode. The response may be an explicit instruction or implicit (e.g. an acknowledgement, or a scheduling grant, or HARQ feedback, etc.). In some embodiments, the response includes a configuration of one or more communication parameters to be used by the apparatus in the second operation mode. In some embodiments, the request from the apparatus includes an indication of one or more communication parameters used (or to be used) by the apparatus in the second operation mode. In some embodiments, the request is sent along with an uplink data transmission from the apparatus. In some embodiments, the data is associated with a particular service requirement and/or a particular application scenario.

In some embodiments, the second trigger is at least one of: absence of the data for transmission to/from the apparatus (e.g. the uplink or downlink data transmission requiring the second operation mode is complete); expiry of a timer; the channel measurement value being above or below a particular threshold (e.g. the channel between the apparatus and the network device improving such that the channel measurement indicates channel quality above a particular threshold); receipt of a request from the apparatus. The request may ask permission for the apparatus to operate in the default operation mode. The request may be explicit or implicit. Examples of implicit requests include: HARQ feedback (e.g. receipt of an ACK that triggers switching back to the default operation mode); a new configuration, which may be associated with returning back to the default operation mode.

In some embodiments, the method further includes transmitting a message to the apparatus, where the message configures at least one of a first set of communication parameters used by the apparatus in the default operation mode and/or configures at least one of a second set of communication parameters used by the apparatus in the second operation mode. The message might or might not be transmitted during the initial access procedure. The message might or might not be sent in RRC signaling or in DCI.

In some embodiments, at least one of the first set of communication parameters and/or at least one of the second set of communication parameters are dependent upon service type and/or application scenario and/or apparatus type.

A network device is also configured to perform any of the methods above. For example, the network device may include a processor and a memory. The memory may include processor-executable instruction that, when executed by the processor, cause the processor to control the network device to perform the methods. In some embodiments, the network device may include a memory to store an indication of at least one of the first set of communication parameters used by the apparatus in the default operation mode and/or to store an indication of at least one of the second set of communication parameters used by the apparatus in the second operation mode. In some embodiments, the processor instructs the network device to perform the method steps performed by the network device. For example, the processor may instruct the network device to wirelessly communicate with the apparatus based on the default operation mode (e.g. after completion of an initial access procedure by the apparatus). As another example, in response to the first trigger the processor may instruct the network device to instead wirelessly communicate with the apparatus based on the second operation mode. As another example, in response to the second trigger the processor may instruct the network device to return to wirelessly communicating with the apparatus based on the default operation mode. A processor 'instructs' the network device by issuing one or more instructions that control the network device to perform the method steps. For example, to instruct the network device to wirelessly communicate with the apparatus based on the default operation mode, the processor controls the network device to communicate (using the transmitter and receiver) in accordance with at least one of the communication parameters of the apparatus that are associated with the default operation mode, e.g. if communication over a 5 MHz BWP is what is used by the apparatus in the default operation mode, then the processor controls the transmitter and receiver of the network device to communicate over the 5 MHz BWP. Similarly, to instruct the network device to wirelessly communicate with the apparatus based on the second operation mode, the processor controls the network device to communicate (using the transmitter and receiver) in accordance with at least one of the communication parameters of the apparatus that are associated with the second operation mode, e.g. if communication over a 100 MHz BWP is what is used by the apparatus in the default operation mode, then the processor controls the transmitter and receiver of the network device to communicate over the 100 MHz BWP.

In view of, and in addition to the above, the following examples are disclosed.

Example 1

A method performed by an apparatus, the method comprising: after completing an initial access procedure: operating in a default operation mode in which the apparatus wirelessly communicates with a network device using a first set of communication parameters; wherein the default operation mode is one of at least two operation modes, wherein the at least two operation modes includes a second operation mode, and wherein the second operation mode consumes more power than the default operation mode.

Example 2

The method of Example 1, wherein the default operation mode consumes less power than any other operation mode used by the apparatus to communicate with the network device after the initial access.

Example 3

The method of Example 1 or Example 2, wherein switching from operating in the default operation mode to instead operating in the second operation mode, and switching from operating in the second operation mode back to operating in the default operation mode occurs without switching radio resource control (RRC) states.

Example 4

The method of any one of Examples 1 to 3, wherein the method further comprises: in response to a first trigger: operating in the second operation mode instead of the default operation mode, wherein in the second operation mode the apparatus wirelessly communicates with the network device using a second set of communication parameters; in response to a second trigger: returning to operating in the default operation mode.

Example 5

The method of Example 4, wherein the first trigger is at least one of: arrival of data for transmission by the apparatus; receipt of signaling from the network device, the signaling instructing the apparatus to switch to the second operation mode; a channel measurement value being above or below a particular threshold.

Example 6

The method of Example 5, wherein the data is associated with a particular service requirement and/or a particular application scenario.

Example 7

The method of Example 5, wherein the first trigger comprises the receipt of the signaling from the network device, and wherein the signaling also configures at least one of the second set of communication parameters.

Example 8

The method of any one of Examples 4 to 7, wherein the second trigger is at least one of: absence of the data for transmission from the apparatus; expiry of a timer; receipt of second signaling from the network device, the second signaling instructing the apparatus to return to the default operation mode.

Example 9

The method of any one of Examples 4 to 8, wherein in response to the first trigger the method comprises: operating in the default operation mode to transmit, to the network device, both first data and an indication of at least one of the second set of communication parameters; operating in the default operation mode to receive, from the network device, signaling acknowledging receipt of the indication of the at least one of the second set of communication parameters; subsequent to receiving the signaling acknowledging receipt: operating in the second operation mode to transmit second data to the network device.

Example 10

The method of any one of Examples 4 to 8, wherein in response to the first trigger the method comprises: operating in the default operation mode to transmit, to the network device, a request to operate in the second operation mode; operating in the default operation mode to receive, from the network device, signaling granting permission to operate in the second operation mode; subsequent to receiving the signaling granting permission to operate in the second operation mode: operating in the second operation mode to transmit data to the network device.

Example 11

The method of Example 10, wherein in response to receiving the signaling granting permission to operate in the second operation mode, the method further comprises starting a timer, and wherein the second trigger is expiry of the timer.

Example 12

The method of any one of Examples 4 to 11, wherein during the initial access procedure a message is received from the network device, the message configuring at least one of the second set of communication parameters.

Example 13

The method of any one of Examples 4 to 12, wherein at least one of the second set of communication parameters is configured using RRC signaling or using DCI.

Example 14

The method of any one of Examples 4 to 13, wherein at least one of the second set of communication parameters is dependent upon service type and/or application scenario and/or apparatus type.

Example 15

The method of any one of Examples 1 to 14, wherein during the initial access procedure a message is received from the network device, the message configuring at least one of the first set of communication parameters.

Example 16

The method of any one of Examples 1 to 15, wherein at least one of the first set of communication parameters is configured using RRC signaling or using DCI.

Example 17

The method of any one of Examples 1 to 16, wherein at least one of the first set of communication parameters is dependent upon service type and/or application scenario and/or apparatus type.

Example 18

An apparatus configured to perform the method of any one of Examples 1 to 17.

Example 19

An apparatus comprising a processor and a memory; the memory including processor-executable instruction that, when executed by the processor, cause the processor to control the apparatus to perform the method of any one of Examples 1 to 17.

Example 20

An apparatus comprising: a memory to store an indication of a first set of communication parameters associated with a default operation mode; a processor to: after completing an initial access procedure, instruct the apparatus to operate in the default operation mode in which the apparatus wirelessly communicates with a network device using the first set of communication parameters; wherein the default operation mode is one of at least two operation modes, wherein the at least two operation modes includes a second operation mode, and wherein the second operation mode consumes more power than the default operation mode.

Example 21

A method performed by a network device, the method comprising: after completion of an initial access procedure by an apparatus: wirelessly communicating with the apparatus based on a default operation mode of the apparatus; in response to a first trigger: instead wirelessly communicating with the apparatus based on a second operation mode of the apparatus; in response to a second trigger: returning to wirelessly communicating with the apparatus based on the default operation mode of the apparatus.

Example 22

The method of Example 21, wherein the default operation mode is associated with a default communication capability of the apparatus, and wherein the second operation mode is associated with a second communication capability of the apparatus.

Example 23

The method of Example 22, wherein the second communication capability is associated with a higher power consumption than the default communication capability.

Example 24

The method of any one of Examples 21 to 23, wherein switching from wirelessly communicating with the apparatus based on the default operation mode to instead wirelessly communicating with the apparatus based on the second operation mode, and wherein switching from wirelessly communicating with the apparatus based on the second operation mode to instead wirelessly communicating with the apparatus based on the default operation mode occurs without a switch of radio resource control (RRC) states.

Example 25

The method of any one of Examples 21 to 24, wherein the first trigger is at least one of: arrival of data for transmission to the apparatus; receipt of a request from the apparatus, the request asking permission for the apparatus to operate in the second operation mode.

Example 26

The method of Example 25, wherein subsequent to receiving the request, the network device sends a response to the apparatus, the response instructing the apparatus to operate in the second operation mode.

Example 27

The method of Example 26, wherein the response includes a configuration of one or more communication parameters used by the apparatus in the second operation mode.

Example 28

The method of Example 25 or Example 26, wherein the request comprises an indication of one or more communication parameters used by the apparatus in the second operation mode.

Example 29

The method of any one of Examples 25 to 28, wherein the request is sent along with an uplink data transmission from the apparatus.

Example 30

The method of Example 25, wherein the data is associated with a particular service requirement and/or a particular application scenario.

Example 31

The method of any one of Examples 21 to 30, wherein the second trigger is at least one of: absence of the data for transmission to the apparatus; expiry of a timer; receipt of a request from the apparatus, the request asking permission for the apparatus to operate in the default operation mode.

Example 32

The method of any one of Examples 21 to 31, further comprising: transmitting a message to the apparatus, the message configuring at least one of a first set of communication parameters used by the apparatus in the default operation mode and/or configuring at least one of a second set of communication parameters used by the apparatus in the second operation mode.

Example 33

The method of Example 32, wherein the message is transmitted during the initial access procedure.

Example 34

The method of Example 32 or Example 33, wherein the message is sent in RRC signaling or in DCI.

Example 35

The method of any one of Examples 32 to 34, wherein at least one of the first set of communication parameters and/or at least one of the second set of communication parameters are dependent upon service type and/or application scenario and/or apparatus type.

Example 36

A method performed by a network device, the method comprising: after completion of an initial access procedure by an apparatus: wirelessly communicating with the apparatus based on a default operation mode of the apparatus; wherein the default operation mode is one of at least two operation modes, wherein the at least two operation modes includes a second operation mode, and wherein the second operation mode consumes more power than the default operation mode.

Example 37

A network device configured to perform the method of any one of Examples 21 to 36.

Example 38

A network device comprising a processor and a memory; the memory including processor-executable instruction that, when executed by the processor, cause the processor to control the network device to perform the method of any one of Examples 21 to 36.

Example 39

A network device comprising: a memory to store an indication of: a first set of communication parameters used by an apparatus in a default operation mode of the apparatus, and a second set of communication parameters used by the apparatus in a second operation mode of the apparatus; a processor to: after completion of an initial access procedure by the apparatus: instruct the network device to wirelessly communicate with the apparatus based on the default operation mode; in response to a first trigger: instruct the network device to instead wirelessly communicate with the apparatus based on the second operation mode; in response to a second trigger: instruct the network device to return to wirelessly communicating with the apparatus based on the default operation mode.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method performed by an apparatus, the method comprising:
   during an initial access procedure: receiving, from a network device, a message configuring a first set of communication parameters to be used by a first operation mode, the message carried in a master information block (MIB) or a system information block (SIB); and
   after completing the initial access procedure: operating in the first operation mode in which the apparatus wirelessly communicates with the network device using the first set of communication parameters that are configured by the MIB or the SIB,
   wherein the first operation mode is one of at least two operation modes, wherein the at least two operation modes include a second operation mode that consumes more power than the first operation mode,
   wherein the method further comprises:
      in response to a first trigger: operating in the second operation mode instead of the first operation mode, wherein in the second operation mode the apparatus wirelessly communicates with the network device using a second set of communication parameters, and wherein the first trigger is based on at least one of: arrival of data for transmission by the apparatus, a measured channel quality, or receipt of signaling from the network device, the signaling explicitly instructing the apparatus to switch to the second operation mode; and
      in response to a second trigger: returning to operating in the first operation mode, wherein the second trigger is at least one of: absence of the data for transmission from the apparatus or receipt of second signaling from the network device, the second signaling instructing the apparatus to return to the first operation mode,
   wherein the first set of communication parameters comprises a first beam tracking parameter and a first radio resource management (RRM) measurement parameter,
   wherein the second set of communication parameters comprises a second beam tracking parameter and a second RRM measurement parameter,
   wherein the first beam tracking parameter corresponds to only one beam tracked by the apparatus, the second beam tracking parameter corresponds to multiple beams tracked by the apparatus, the first RRM measurement parameter comprises parameters of measurement of only one neighboring cell neighboring a serving cell of the apparatus, and the second RRM measurement parameter comprises parameters of measurement of multiple neighboring cells neighboring the serving cell,
   wherein the first set of communication parameters further comprises a first number of transmit antennas, a first number of receiving antennas, a first communication bandwidth, a first monitoring rate on downlink control information, a first subcarrier spacing value, and a first advanced HARQ processing time capability, and
   wherein the second set of communication parameters further comprises a second number of transmit antennas, a second number of receiving antennas, a second communication bandwidth, a second monitoring rate on downlink control information, a second subcarrier spacing value, and a second advanced HARQ processing time capability.

2. The method of claim 1, wherein the first operation mode consumes less power than any other operation mode used by the apparatus to communicate with the network device after the initial access procedure.

3. The method of claim 1, wherein switching from operating in the first operation mode to instead operating in the second operation mode, and switching from operating in the second operation mode back to operating in the first operation mode occurs without switching radio resource control (RRC) states.

4. The method of claim 1, wherein a value of one of the first set of communication parameters is indicated in the message, and wherein the value is based on at least one of: apparatus type, application scenario, or service type.

5. The method of claim 1, wherein in response to the first trigger the method comprises:
   operating in the first operation mode to transmit, to the network device, a request to operate in the second operation mode;
   operating in the first operation mode to receive, from the network device, signaling granting permission to operate in the second operation mode; and
   subsequent to receiving the signaling granting the permission to operate in the second operation mode: operating in the second operation mode to transmit data to the network device.

6. The method of claim 1, wherein during the initial access procedure a second message is received from the network device, the second message configuring at least one of the second set of communication parameters.

7. An apparatus comprising:
   a memory to store an indication of a first set of communication parameters associated with a first operation mode;
   at least one processor to:
   during an initial access procedure: receive, from a network device, a message configuring the first set of communication parameters to be used by the first operation mode, the message carried in a master information block (MIB) or a system information block (SIB); and
   after completing the initial access procedure, instruct the apparatus to operate in the first operation mode in which the apparatus wirelessly communicates with the network device using the first set of communication parameters that are configured by the MIB or the SIB,
   wherein the first operation mode is one of at least two operation modes, wherein the at least two operation modes include a second operation mode that consumes more power than the first operation mode,
   wherein the at least one processor is further to:
      in response to a first trigger: instruct the apparatus to operate in the second operation mode instead of the first operation mode, wherein in the second operation mode the apparatus wirelessly communicates with the network device using a second set of communication parameters, and wherein the first trigger is based on at least one of: arrival of data for transmission by the apparatus, a measured channel quality, or receipt of signaling from the network device, the signaling explicitly instructing the apparatus to switch to the second operation mode, and
      in response to a second trigger: return to operating in the first operation mode, wherein the second trigger is at least one of: absence of the data for transmission from the apparatus or receipt of second signaling from the network device, the second signaling instructing the apparatus to return to the first operation mode, wherein the first set of communication parameters comprises a first beam tracking parameter and a first radio resource management (RRM) measurement parameter, wherein the second set of communication parameters comprises a second beam tracking parameter or a second RRM measurement parameter, wherein the first beam tracking parameter corresponds to only one beam tracked by the apparatus, the second beam tracking parameter corresponds to multiple beams tracked by the apparatus, the first RRM measurement parameter comprises parameters of measurement of only one neighboring cell neighboring a serving cell of the apparatus, and the second RRM measurement parameter comprises parameters of measurement of multiple neighboring cells neighboring the serving cell, wherein the first set of communication parameters further comprises a first number of transmit antennas, a first number of receiving antennas, a first communication bandwidth, a first monitoring rate on downlink control information, a first subcarrier spacing value, and a first advanced HARQ processing time capability, and wherein the second set of communication parameters further comprises a second number of transmit antennas, a second number of receiving antennas, a second communication bandwidth, a second monitoring rate on downlink control information, a second subcarrier spacing value, and a second advanced HARQ processing time capability.

8. The apparatus of claim 7, wherein the first operation mode consumes less power than any other operation mode used by the apparatus to communicate with the network device after the initial access procedure.

9. The apparatus of claim 7, wherein switching from operating in the first operation mode to instead operating in the second operation mode, and switching from operating in the second operation mode back to operating in the first operation mode occurs without switching radio resource control (RRC) states.

10. The apparatus of claim 7, wherein a value of one of the first set of communication parameters is indicated in the message, and wherein the value is based on at least one of: apparatus type, application scenario, and service type.

11. The apparatus of claim 7, wherein in response to the first trigger the at least one processor is to instruct the apparatus to:
operate in the first operation mode to transmit, to the network device, a request to operate in the second operation mode;
operate in the first operation mode to receive, from the network device, signaling granting permission to operate in the second operation mode; and
subsequent to receiving the signaling granting permission to operate in the second operation mode: operate in the second operation mode to transmit data to the network device.

12. The apparatus of claim 7, wherein during the initial access procedure the at least one processor is to receive a second message from the network device, the second message configuring at least one of the second set of communication parameters.

13. The method of claim 1, wherein the method comprises:
operating in the first operation mode to transmit, to the network device, both data and an indication of at least one of the second set of communication parameters associated with the second operation mode;
operating in the first operation mode to receive, from the network device, signaling acknowledging receipt of the indication of the at least one of the second set of communication parameters; and
subsequent to receiving the signaling acknowledging receipt: operating in the second operation mode to wirelessly communicate with the network device.

14. The apparatus of claim 7, wherein the at least one processor is to instruct the apparatus to:
operate in the first operation mode to transmit, to the network device, both data and an indication of at least one of the second set of communication parameters associated with the second operation mode;
operate in the first operation mode to receive, from the network device, signaling acknowledging receipt of the indication of the at least one of the second set of communication parameters; and
subsequent to receiving the signaling acknowledging receipt: operate in the second operation mode to wirelessly communicate with the network device.

15. The method of claim 1,
wherein the apparatus operating in the second operation mode monitors downlink notification information more frequently than the apparatus operating in the first operation mode,
wherein the apparatus operating in the second operation mode communicates on a wider bandwidth than the apparatus operating in the first operation mode, or
wherein the apparatus operating in the second operation mode operates using more transmission antennas than the apparatus operating in the first operation mode.

16. A non-transitory computer readable storage medium having instructions stored thereon, when the instructions executed by an apparatus, cause the apparatus to perform operations, the operations comprising:
during an initial access procedure: receiving, from a network device, a message configuring a first set of communication parameters to be used by a first operation mode, the message carried in a master information block (MIB) or a system information block (SIB); and
after completing the initial access procedure: operating in the first operation mode in which the apparatus wirelessly communicates with the network device using the first set of communication parameters that are configured by the MIB or the SIB,
wherein the first operation mode is one of at least two operation modes, wherein the at least two operation modes include a second operation mode that consumes more power than the first operation mode,
wherein the operations further comprise:
in response to a first trigger: operating in the second operation mode instead of the first operation mode, wherein in the second operation mode the apparatus wirelessly communicates with the network device using a second set of communication parameters, and wherein the first trigger is based on at least one of: arrival of data for transmission by the apparatus, a measured channel quality, or receipt of signaling from the network device, the signaling explicitly instructing the apparatus to switch to the second operation mode; and in response to a second trigger: returning to operating in the first operation mode, wherein the second trigger is at least one of: absence of the data for transmission from the apparatus or receipt of second signaling from the network device, the second signaling instructing the apparatus to return to the first operation mode, wherein the first set of communication parameters comprises a first beam tracking parameter and a first radio resource management (RRM) measurement parameter, wherein the second set of communication parameters comprises a second beam tracking parameter and a second RRM measurement parameter, wherein the first beam tracking parameter corresponds to only one beam tracked by the apparatus, the second beam tracking parameter corresponds to multiple beams tracked by the apparatus, the first RRM measurement parameter comprises parameters of measurement of only one neighboring cell neighboring a serving cell of the apparatus, and the second RRM measurement parameter comprises parameters of measurement of multiple neighboring cells neighboring the serving cell, wherein the first set of communication parameters further comprises a first number of transmit antennas, a first number of receiving antennas, a first communication bandwidth, a first monitoring rate on downlink control information, a first subcarrier spacing value, and a first advanced HARQ processing time capability, and wherein the second set of communication parameters further comprises a second number of transmit antennas, a second number of receiving antennas, a second communication bandwidth, a second monitoring rate on downlink control information, a second subcarrier spacing value, and a second advanced HARQ processing time capability.

17. The non-transitory computer readable storage medium of claim 16, wherein the first operation mode consumes less power than any other operation mode used by the apparatus to communicate with the network device after the initial access procedure.

18. The non-transitory computer readable storage medium of claim 16, wherein switching from operating in the first operation mode to instead operating in the second operation mode, and switching from operating in the second operation mode back to operating in the first operation mode occurs without switching radio resource control (RRC) states.

19. The method of claim 1, wherein the first operation mode is a low-power default operation mode that supports one or more of:
   only scheduling free transmissions,
   only 15 KHz or 30 KHz subcarrier spacings (SCS) for operating on low frequency bands, or,
   only 60 KHz or 120 KHz SCS for operating on high frequency bands.

20. The apparatus of claim 7, wherein the first operation mode is a low-power default operation mode that supports one or more of:
   only scheduling free transmissions,
   only 15 KHz or 30 KHz subcarrier spacings (SCS) for operating on low frequency bands, or,
   only 60 KHz or 120 KHz SCS for operating on high frequency bands.

* * * * *